(12) United States Patent
Anderson

(10) Patent No.: US 10,675,931 B2
(45) Date of Patent: Jun. 9, 2020

(54) TRAILER BRACKET FOR SWAY CONTROL TOWING SYSTEM

(71) Applicant: Progress Mfg. Inc., Provo, UT (US)

(72) Inventor: Jed Anderson, Lindon, UT (US)

(73) Assignee: PROGRESS MFG. INC., Provo, UT (US)

( * ) Notice: Subject to any disclaimer, the term of this patent is extended or adjusted under 35 U.S.C. 154(b) by 10 days.

(21) Appl. No.: 15/652,133

(22) Filed: Jul. 17, 2017

(65) Prior Publication Data

US 2018/0126810 A1     May 10, 2018

Related U.S. Application Data

(63) Continuation of application No. 15/428,113, filed on Feb. 8, 2017, now abandoned, which is a continuation of application No. 14/948,141, filed on Nov. 20, 2015, now abandoned, which is a continuation of application No. 14/791,199, filed on Jul. 2, 2015, now abandoned, which is a continuation of application No. 14/252,698, filed on Apr. 14, 2014, now abandoned, which is a continuation of application No. 14/094,586, filed on Dec. 2, 2013, now abandoned, which is a continuation-in-part of application No. 13/936,091, filed on Jul. 5, 2013, now abandoned, which is a continuation of application No. 13/759,024, filed on Feb. 4, 2013, now abandoned, which is a continuation of application No. 13/622,353, filed on Sep. 18, 2012, now abandoned, which is a continuation of application No. 13/463,729, filed on May 3, 2012, now abandoned, which is a continuation of application No. 12/885,426, filed on Sep. 17, 2010, now abandoned, which is a continuation of application No.

(Continued)

(51) Int. Cl.
*B60D 1/34*     (2006.01)
*B60D 1/06*     (2006.01)
*B60D 1/32*     (2006.01)

(52) U.S. Cl.
CPC ............... *B60D 1/345* (2013.01); *B60D 1/06* (2013.01); *B60D 1/325* (2013.01)

(58) Field of Classification Search
CPC ........... B60D 1/345; B60D 1/06; B60D 1/325
See application file for complete search history.

(56) References Cited

U.S. PATENT DOCUMENTS 3,403,928 A * 10/1968 Laughlin ................ B60D 1/345
                                                                     280/406.2
3,520,556 A * 7/1970 Warner .................. B60D 1/345
                                                                    280/406.2

(Continued)

*Primary Examiner* — Kevin Hurley
*Assistant Examiner* — Michael R Stabley
(74) *Attorney, Agent, or Firm* — Morriss O'Bryant Compagni Cannon, PLLC

(57) ABSTRACT

An apparatus for reducing sway between a towing vehicle and a trailer is disclosed. The apparatus may comprise a bracket assembly that attaches to a tongue of a trailer. The bracket assembly may include a surface for supporting a spring arm extending from a weight distribution hitch installed on a tow vehicle. The bracket assembly may include a clamp that is able to apply a frictional force to thereby oppose movement of the spring arm. The clamping force applied by the clamp may be variable to ensure proper operation.

37 Claims, 26 Drawing Sheets

Related U.S. Application Data

12/774,640, filed on May 5, 2010, now abandoned, which is a continuation of application No. 12/636,557, filed on Dec. 11, 2009, now abandoned, which is a continuation of application No. 12/433,795, filed on Apr. 30, 2009, now abandoned, which is a continuation of application No. 12/335,444, filed on Dec. 15, 2008, now abandoned.

(60) Provisional application No. 61/007,717, filed on Dec. 13, 2007.

(56) References Cited

U.S. PATENT DOCUMENTS

| | | | | |
|---|---|---|---|---|
| 3,542,395 | A | * | 11/1970 | Millikan ................ B60D 1/065 280/406.2 |
| 3,552,771 | A | * | 1/1971 | Hendricks ............. B60D 1/065 280/406.2 |
| 3,600,004 | A | * | 8/1971 | Newkirk ................ B60D 1/345 280/156 |
| 3,731,950 | A | * | 5/1973 | Burcham ............... B60D 1/345 280/406.2 |
| 4,212,483 | A | | 7/1980 | Howard |
| 5,628,525 | A | * | 5/1997 | Kass ...................... B60D 1/247 280/406.2 |
| 5,716,042 | A | | 2/1998 | Derviller |
| 5,725,231 | A | | 3/1998 | Buie |
| 5,823,268 | A | | 10/1998 | Barnes |
| 5,868,414 | A | * | 2/1999 | McCoy .................. B60D 1/143 280/406.2 |
| 5,951,036 | A | | 9/1999 | Sargent |
| 5,984,341 | A | * | 11/1999 | Kass ...................... B60D 1/143 280/406.1 |
| 6,142,500 | A | | 11/2000 | Sargent |
| 6,474,675 | B1 | | 11/2002 | Bockman et al. |
| 6,629,701 | B1 | | 10/2003 | Colibert |
| 6,722,682 | B2 | | 4/2004 | Valliere et al. |
| 6,860,501 | B2 | | 3/2005 | Schmidt et al. |
| 7,025,370 | B2 | | 4/2006 | Anderson et al. |
| 7,137,643 | B1 | | 11/2006 | Hsueh |
| 7,261,312 | B1 | | 8/2007 | Joplin |
| 7,303,205 | B2 | | 12/2007 | Richardson et al. |
| 7,967,320 | B2 | * | 6/2011 | Anderson .............. B60D 1/345 280/405.1 |
| 2005/0230932 | A1 | | 10/2005 | Richardson et al. |
| 2006/0049612 | A1 | * | 3/2006 | Anderson ................ B60D 1/00 280/405.1 |
| 2006/0261573 | A1 | | 11/2006 | Hsueh |
| 2008/0122198 | A1 | * | 5/2008 | Anderson ............. B60D 1/065 280/455.1 |
| 2008/0143078 | A1 | * | 6/2008 | McCoy .................. B60D 1/247 280/406.1 |

* cited by examiner

TRAILER BRACKET FOR SWAY CONTROL TOWING SYSTEM

CROSS-REFERENCE TO RELATED APPLICATIONS

This application is a continuation of U.S. patent application Ser. No. 15/428,113, filed Feb. 8, 2017, which is a continuation of U.S. patent application Ser. No. 14/948,141, filed Nov. 20, 2015, which is a continuation of U.S. patent application Ser. No. 14/791,199, filed Jul. 2, 2015, which is a continuation of U.S. patent application Ser. No. 14/252,698, filed Apr. 14, 2014, which is a continuation of U.S. patent application Ser. No. 14/094,586, filed Dec. 2, 2013, which is a continuation of U.S. patent application Ser. No. 13/936,091, filed Jul. 5, 2013, which is a continuation of U.S. patent application Ser. No. 13/759,024, filed Feb. 4, 2013, which is a continuation-in-part of U.S. patent application Ser. No. 13/622,353, filed Sep. 18, 2012, which is a continuation of U.S. patent application Ser. No. 13/463,729, filed May 3, 2012, which is a continuation of U.S. patent application Ser. No. 12/885,426, filed Sep. 17, 2010, which is a continuation of U.S. patent application Ser. No. 12/774,640, filed May 5, 2010, which is a continuation of U.S. patent application Ser. No. 12/636,557, filed Dec. 11, 2009, which is a continuation of U.S. patent application Ser. No. 12/433,795, filed Apr. 30, 2009, which is a continuation of U.S. patent application Ser. No. 12/335,444, filed Dec. 15, 2008, which claims the benefit of U.S. Provisional Application No. 61/007,717, filed Dec. 13, 2007, which are hereby incorporated by reference herein in their entireties, including but not limited to those portions that specifically appear hereinafter, the incorporation by reference being made with the following exception: In the event that any portion of the above-referenced applications is inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Invention

The present disclosure relates generally to trailer hitches, and more particularly, but not necessarily entirely, to trailer hitches that control sway between a tow vehicle and a trailer.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing. Some hitches may also have load equalizing systems to distribute loads and allow the towing vehicle and trailer to remain level. Other mechanisms may also be used in association with a trailer hitch to reduce side sway of the trailer. U.S. Pat. No. 3,347,561 (granted Oct. 17, 1967 to Hedgepeth) and U.S. Pat. No. 3,021,154 (granted Feb. 13, 1962 to Hedgepeth) disclose exemplary trailer hitch mechanisms known in the art.

Another style of a sway control hitch includes a telescoping bar extending from the hitch. An outer tube that is attached to, and extends from, the trailer tongue is inserted over the telescoping bar extending from the hitch. The outer tube includes a clamping mechanism that can be clamped onto the telescoping bar to thereby impose a frictional force to oppose movement of the telescoping bar. The amount of sway control can be adjusted by increasing or decreasing the clamping force on the telescoping bar. Often, a piece of friction material, such as that found in automotive brake pads, is used at the clamping point.

While the use of an outer tube and a telescoping bar as described above may reduce some sway between a towing vehicle and a trailer, this type of sway control device has some drawbacks. First, this type of sway control device may require holes to be drilled and tapped into the side of the tongue of the trailer. Second, this type of sway control device may require the use of a specialized ball mount that allows for a larger hitch ball for coupling the trailer and a smaller hitch ball for coupling the telescoping bar. Third, this type of sway control device does not generally provide for weight distribution in addition to sway control. Next, this type of sway control device may limit the turning radius of the towing vehicle, and in some instances must be disconnected for sharp turns and backing as overturning may result in tearing the sway control device from the tongue of the trailer. Thus, prior to making sharp turns or backing, a driver must stop the towing vehicle, get out, and uncouple the telescoping bar from the hitch. Finally, this type of sway control device may lose effectiveness when the telescoping bar is wet due to the decrease in friction caused by wet surfaces.

Thus, despite the advantages offered by the prior art sway reduction devices, the prior art is characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the embodiment described herein.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
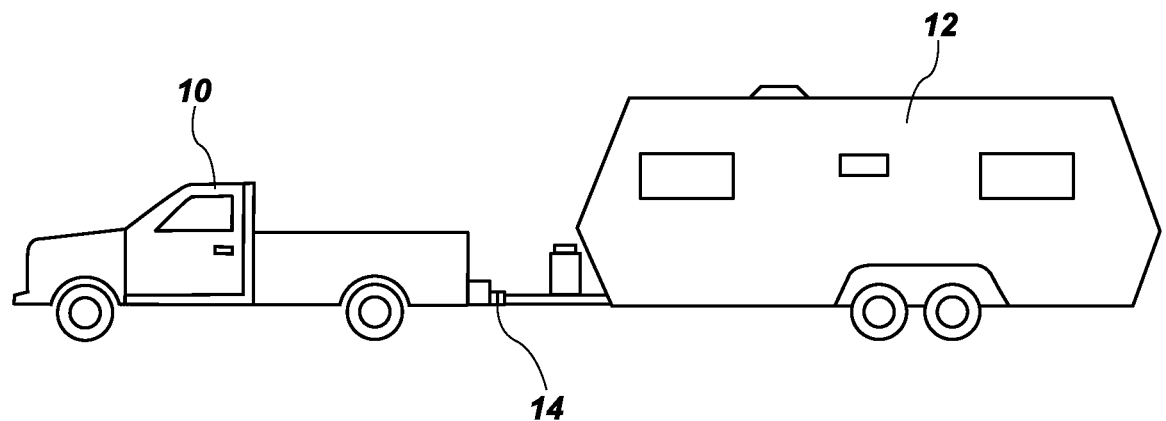
FIG. 1 is a side view of a towing vehicle towing a trailer with a trailer hitch.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. Also, as used herein, the terms "comprising," "including," "having," "containing," "characterized by," and grammatical equivalents thereof are inclusive or open-ended terms that do not exclude additional, unrecited elements or method steps. It will be appreciated that as used herein, the term "frictional force" means a force that opposes the relative motion or the tendency toward such motion of two surfaces in contact.

Figure 2:
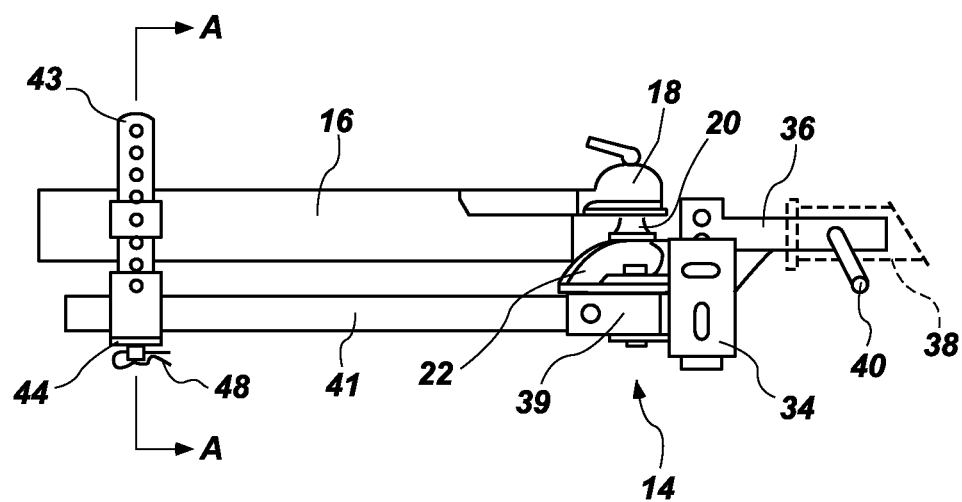
FIG. 2 is a side view from a direction opposite that of FIG. 1, of a trailer hitch attached to a break-away portion of a trailer tongue.

Referring now to FIG. 1, a side view is shown of a towing vehicle 10 towing a trailer 12 with a trailer hitch 14. It will be understood that the towing vehicle 10 may be any variety of vehicle known in the art, such as a car or truck, or any variety of off-road vehicle, for example. Likewise, the principles of the present disclosure may be utilized with any variety of trailer 12 known in the art, such as camping trailers, boat trailers or cargo trailers, for example. As shown in FIG. 2 the trailer 12 may include a tongue 16 extending at a forward end of the trailer 12. A coupler 18 may be located on an end of the tongue 16 for receiving a ball 20 of the hitch 14, in a manner known in the art.

Figure 3:
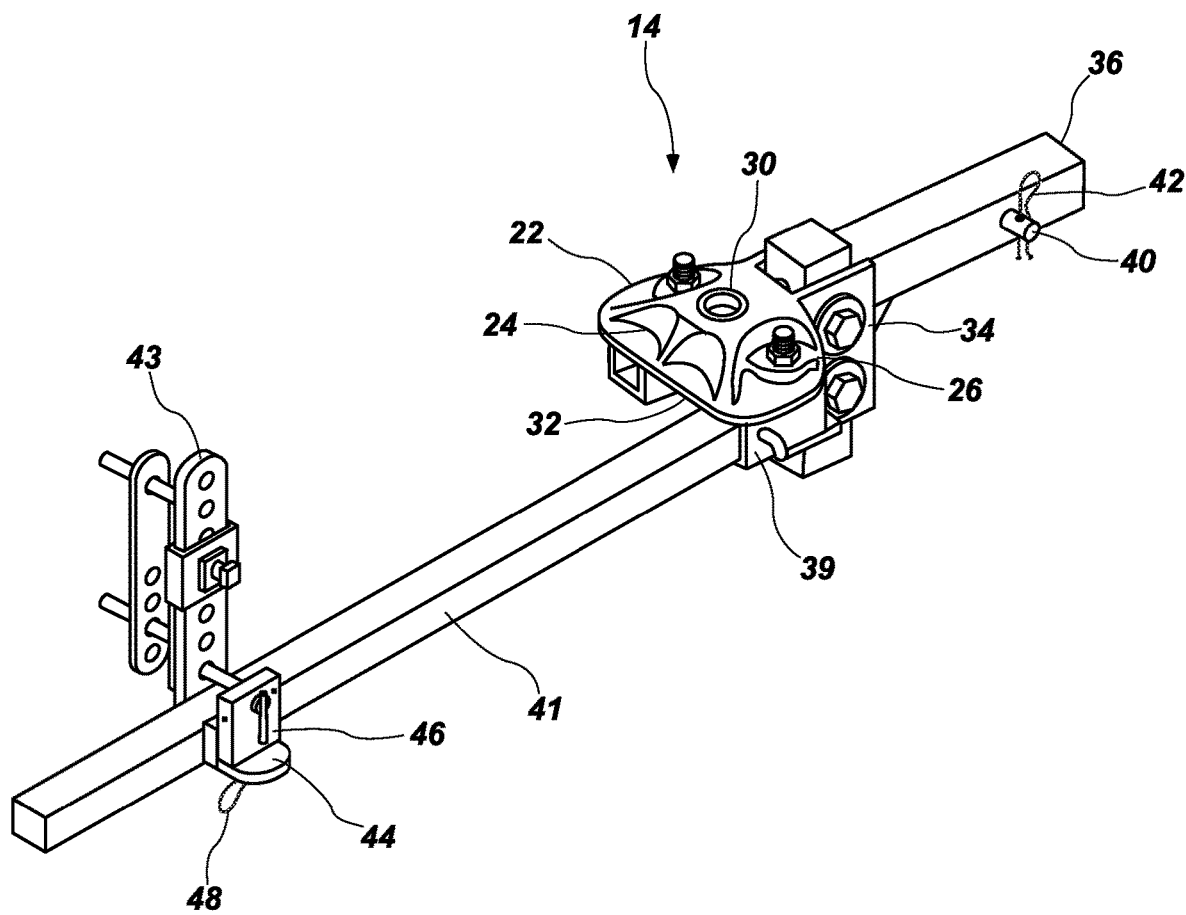
FIG. 3 is a perspective view of a portion of the trailer hitch of FIG. 2.

Referring to FIGS. 2 and 3, the hitch 14 may include a hitch head 22. The hitch head 22 may include a front side 24 for facing the trailer 12, a back side 26 for facing the towing vehicle 10, an upper side 28 having an opening 30 for receiving a stem of a hitch ball 20, and a lower side 32. Through bores 31 may extend from the upper side 28 to the lower side 32 for receiving bolts or other fastening mechanisms to attach the hitch head 22 to other structures. The back side 26 of the hitch head 22 may include an attachment member 34 for removably attaching a hitch shank 36. The attachment member 34 may be formed of a substantially "U" shaped channel member having openings for receiving bolts or other such fasteners to attach the hitch shank 36. It will be understood that the hitch shank 36 may be attached to a vehicle receiver 38 as shown in dashed lines in FIG. 2. An attachment mechanism such as a hitch pin 40 and a clip 42 may be used to secure the hitch shank 36 to the receiver 38.

A pair of sockets 39 may also be attached to the hitch head 22 on the lower side 32 for receiving spring arms 41. It will be understood that only a single spring arm 41 is shown in FIGS. 2 and 3 for purposes of clarity. However, it will be appreciated that two spring arms 41 may be used with the hitch 14. An "L" bracket 43, which may be referred to herein as a support bracket, may be used to attach the spring arm 41 to the tongue 16 of the trailer 12. As is known in the art, the weight of the trailer 12 may cause the back end of the towing vehicle 10 to sink and the front end of the towing vehicle 10 to raise. The spring arms 41 may be used to place an upward force on the hitch head 22 to equalize the distribution of the load and allow the towing vehicle 10 and trailer 12 to be more level. The spring arms 41 may also be beneficial for reducing sway of the trailer 12 as a surface of the spring arms 41 frictionally engages a surface of the "L" bracket 43. In addition, the height of the "L" bracket 43 may be varied with respect to the tongue 16 of the trailer 12 to thereby increase or decrease the friction between the "L" bracket 43 and the spring arms 41. For example, the higher the "L" bracket 43 is mounted with respect to the tongue 16 of the trailer 12, the more friction there will be between the spring arms 41 and the "L" bracket 43. It will further be understood that the spring arm 41s may frictionally engage the "L" bracket 43. However, this frictional engagement between the spring arms 41 and the "L" bracket 43 may not be strong enough to reduce all of the sway between the towing vehicle 10 and the trailer 12 without the additional clamping mechanisms as disclosed herein. Further, variations in the placement of the "L" bracket 43 may negatively impact the weight distribution between the tow vehicle and the trailer.

It will be understood that various of the features discussed above may be used in combination with the hitch head 22, and that the hitch head 22 may be used without all of the features discussed above. For example, the spring arms 41 may have various different configurations within the scope of the present disclosure. Similarly, the "L" bracket 43 or hitch shank 36 may not be necessary in some embodiments, or they may have various different configurations. A bottom surface of the spring arms 41 may be disposed on a horizontal surface 44 of the bracket 43. A clamping member 46 may prevent the spring arm 41 from disengaging the horizontal surface 44 of the "L" bracket 43. The clamping member 46 may be secured to the bracket 43 with a pin 48.

Figure 4:
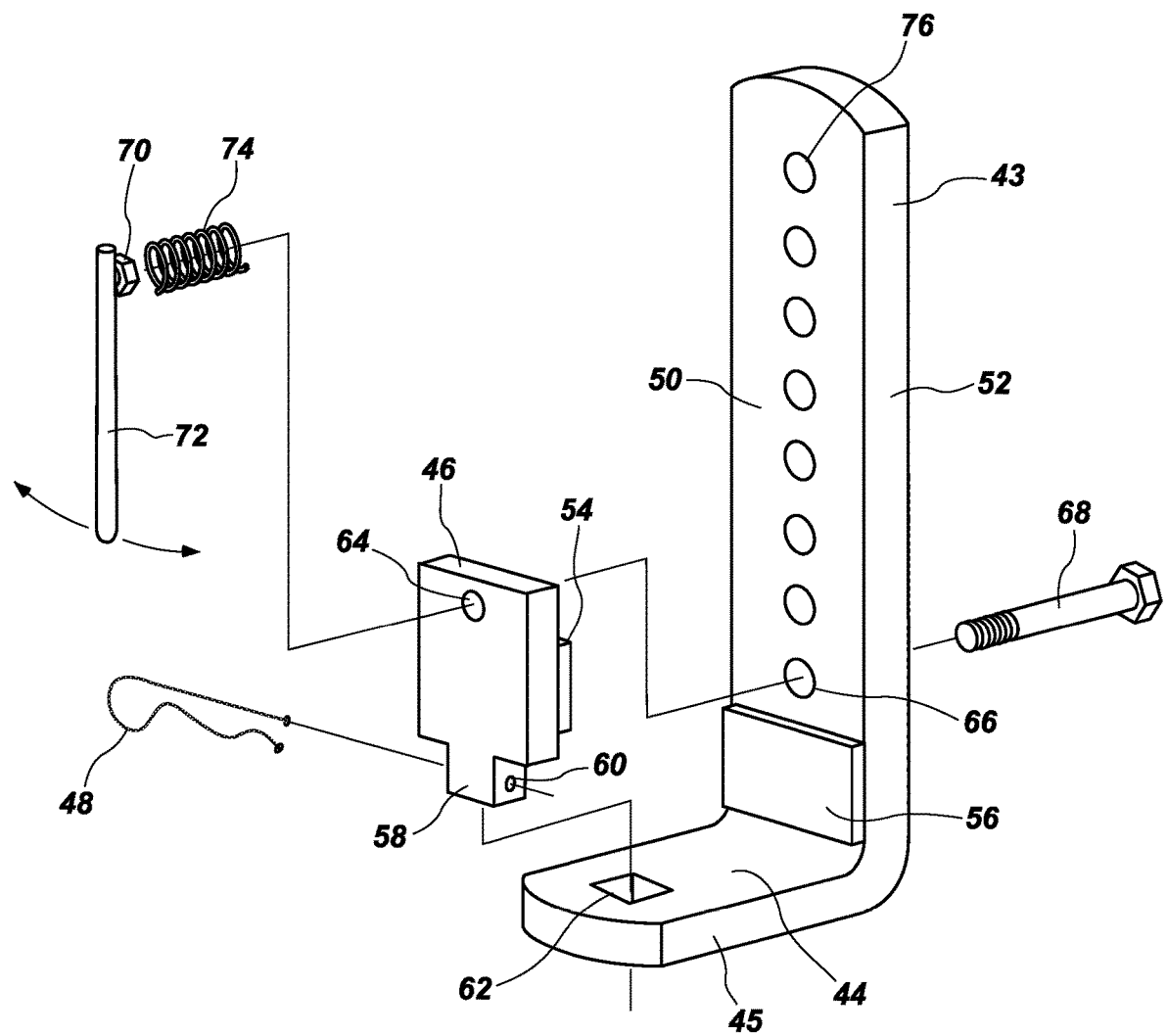
FIG. 4 is an exploded view of an "L" bracket with a clamping mechanism.

Referring now to FIG. 4, there is shown an exploded view of the "L" bracket 43 and the clamping member 46. A vertical member 52 of the bracket 43 may form another clamping member 50, which may be referred to herein as the first clamping member, with clamping member 46 referred to herein at times as the second clamping member. It will be appreciated that a spring arm 41 may engage the horizontal surface 44 of a horizontal member 45 of the "L" bracket 43 at a location that is situated between the clamping members 46 and 50. Disposed on each of the clamping members 46 and 50 may be friction linings 54 and 56, respectively. The friction linings 54 and 56 may be formed from a similar material as brake pads for vehicles or any other type of material suitable for the purposes described herein. It will be appreciated that the selection of material for the friction linings 54 and 56 may itself increase or decrease the frictional force imposed on the spring arms 41 as some materials have a higher friction coefficient than other materials. For example, the friction linings 54 and 56 may be formed from plastic, steel, copper and rubber. It should be noted that in other embodiments, the friction linings 54 and 56 are not needed. Instead, the side surfaces of the spring arm 41 may directly contact the clamping member 46 and the "L" bracket 43 to utilize the friction qualities of the clamping member 46 and the "L" bracket 43.

The clamping member 46 may include a projection member 58 extending downwardly from a lower surface of the clamping member 46. The projection member 58 may include a bore 60 that is sized and dimensioned for receiving the pin 48. The projection member 58 may be sized and dimensioned to be inserted into a slot 62 formed in the horizontal surface 44 of the "L" bracket 43. The pin 48 may prevent the projection member 58 from disengaging the slot 62.

Disposed near a topmost portion of the clamping member 46 may be a bore 64. Disposed above the friction member 56 on the vertical member 52 may be a bore 66. When the projection member 58 of the clamping member 46 is installed into slot 62, the bores 64 and 66 may be in alignment. When the bores 64 and 66 are so aligned, a threaded shaft of a fastener 68 may be inserted through the bores 64 and 66 to thereby engage a threaded nut 70. A lever 72 may be coupled to the nut 70 to thereby facilitate the engagement of the fastener 68 to the nut 70. The lever 72 may be further operable to adjust the amount of clamping force applied to the spring arm 41 by the clamping members 46 and 50. The lever 72 may provide a useful way for a user to variable adjust the amount of clamping force. It will be appreciated that the lever 72 may not be present and that the nut 70 may be adjusted with a tool, or the nut 70 may be in the form of a wing nut. A resilient member 74 may be disposed on the end of the fastener 68 and between the nut 70 and the clamping member 46. The purpose of the resilient member 74 may be to bias the clamping members 46 and 50 against the spring arm 41.

It will be appreciated from the above description and depiction of FIG. 4 that clamping member 50, also known as the first clamping member, may be affixed in a stationary manner to "L" bracket or support bracket 43. It will further be appreciated that clamping member 46, also known as the second clamping member, is moveable with respect to the support bracket 43 and the first clamping member 50. For example, second clamping member 46 is moveable as fastener 68 and its components, including potentially nut 70, lever 72 and resilient member 74, all work to bias or move the second clamping member 46 with respect to the first clamping member 50 and the support bracket 43.

It will further be appreciated that second clamping member 46 is removably attachable to support bracket 43. The phrase "removably attachable" as used herein should be construed broadly to refer to any manner or structure by which second clamping member 46 may be attached or secured to bracket 43, and thereafter removed or unattached from bracket 43. For example, second clamping member 46 may be removably attachable to support bracket 43 by operation of projection member 58 of the clamping member 46 and slot 62 of the support bracket 43, along with pin 48. In other embodiments, second clamping member 46 may removably attachable as further contemplated herein, and as otherwise known to those of ordinary skill in the art.

A plurality of bores 76 may be formed in the vertical member 52 of the "L" bracket 43 and may be used to mount the "L" bracket 43 onto a tongue 16 of a trailer 12 as shown in FIGS. 2 and 3.

Figure 5:
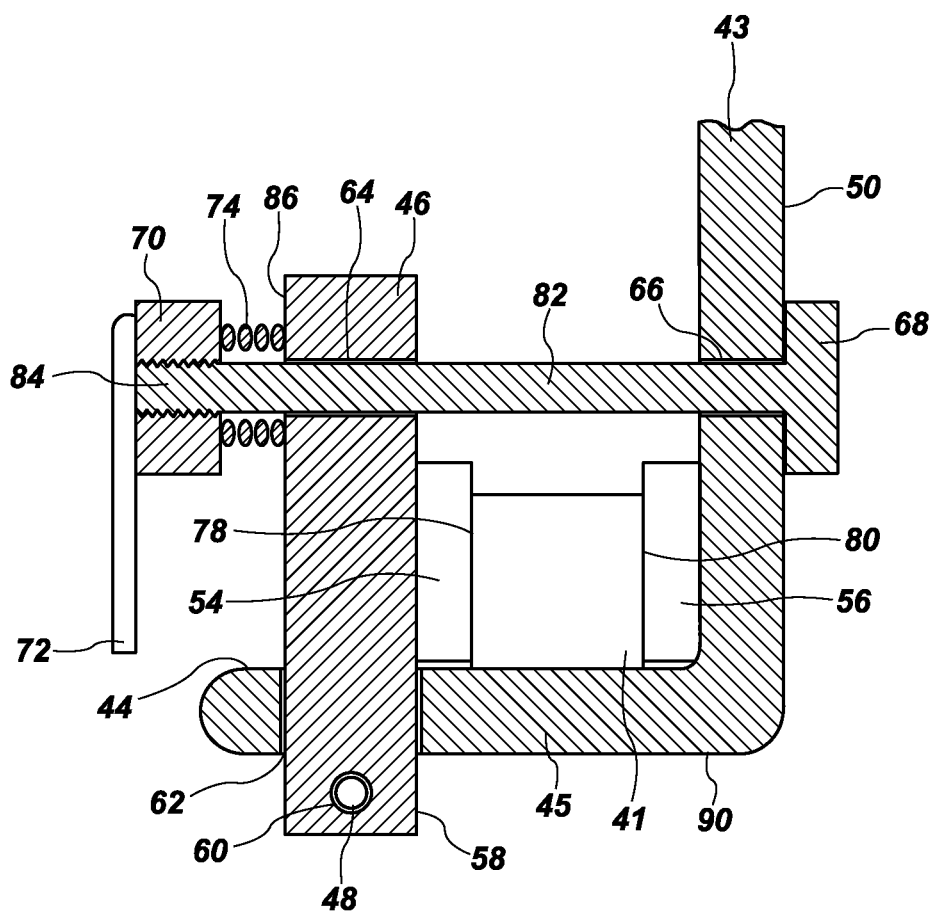
FIG. 5 is a cross sectional view taken along the Section A-A shown in FIG. 2.

Turning now to FIG. 5, there is shown a fragmentary cross sectional view taken along the section A-A shown in FIG. 2. The clamping members 46 and 50 are shown clamped to the spring arm 41. In particular, the friction linings 54 and 56 of the clamping members 46 and 50, respectively, may engage a first side surface 78 and a second side surface 80 of the spring arm 41, respectively. The clamping members 46 and 50 may be clamped together via the fastener 68. In particular, a shaft 82 of the fastener 68 may extend through bores 66 and 64. The nut 70 may engage a threaded end 84 of the shaft 82. The resilient member 74 may be installed onto the shaft 82 of the fastener 68 between the nut 70 and a surface 86 of the clamping member 46. The resilient member 74 may be operable to bias the clamping member 46 against the spring arm 41 as will be explained in further detail below.

The projection member 58 of the clamping member 46 may be inserted into the slot 62 formed through the surface 44. The slot 62 may extend completely through the horizontal member 45 of the "L" bracket 43 such that a bottom portion of the projection member 58 extends past an underside 90 of the horizontal member 45. The pin 48 that prevents the projection member 58 from disengaging the slot 62 may be installed into the bore 60 of the projection member 58.

The resilient member 74 may bias the clamping member 46 such that the friction linings 54 and 56 may apply the appropriate amount of force to prevent sway between the tow vehicle 10 and the trailer 12. The biasing of the clamping member 46 against the spring arm 41 may also be beneficial when the spring arm 41 is a tapered spring arm. The biasing of the clamping member 46 by the resilient member 74 may ensure that the frictional linings 54 and 56 remain in contact with a tapered spring arm. Thus, it will be understood that the function of the resilient member 74 may be to take up variable clearance with tapered spring arms. In one embodiment, the resilient member 74 may comprise a coiled spring. It will be appreciated that the use of the resilient member 74 may be optional.

It will be appreciated that other embodiments of the present disclosure may include, in addition to clamping side to side on the spring arms, clamping top to bottom on the spring arms, clamping side to side and top to bottom, clamping diagonally from corner to corner on the spring arm, and clamping a tapered spring arm.

Figure 6:
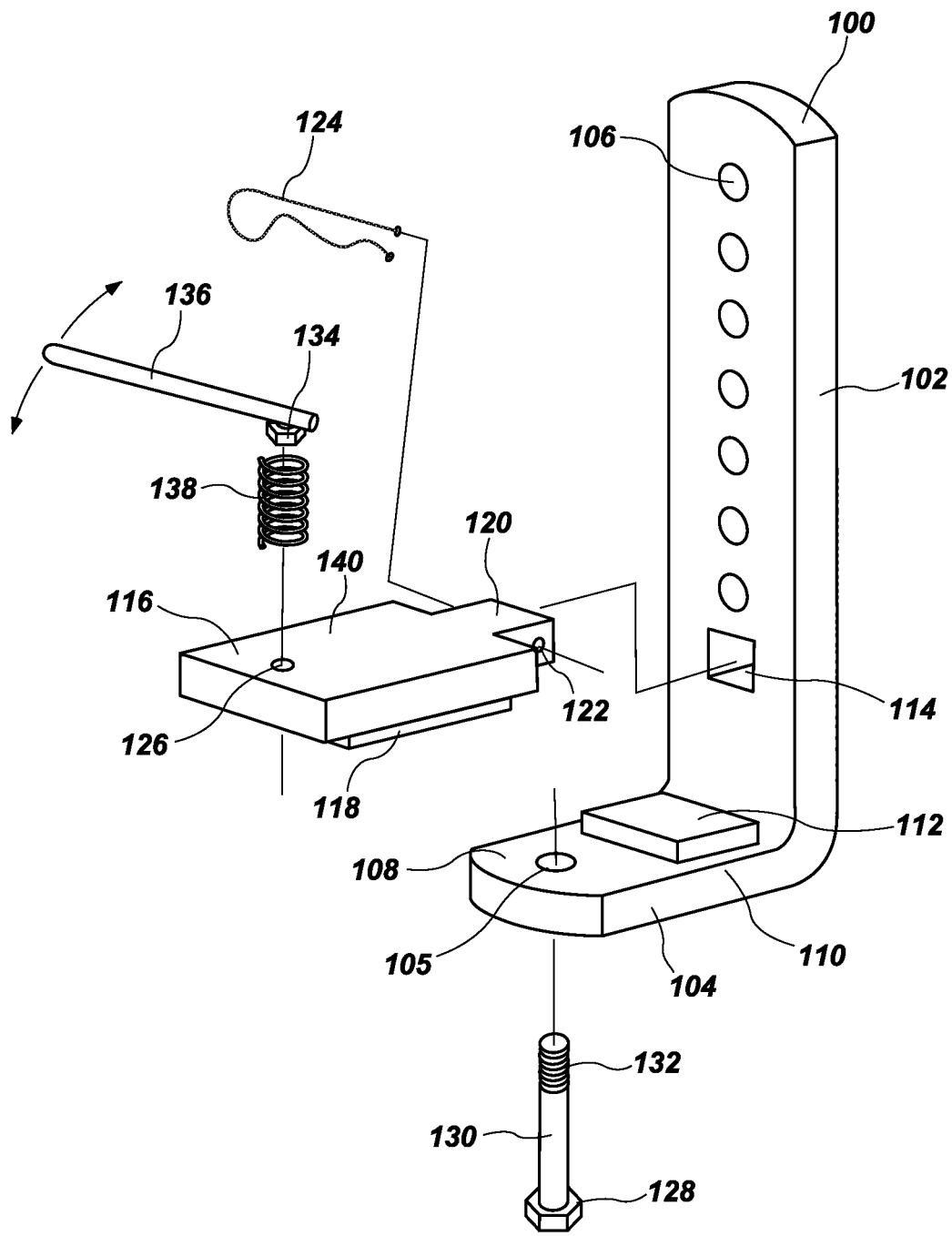
FIG. 6 is an exploded view of another embodiment of an "L" bracket with a clamping mechanism.

Referring now to FIG. 6, there is depicted an exploded embodiment of the present disclosure including an "L" bracket 100 comprising a vertical member 102 and a horizontal member 104. A plurality of mounting bores 106 may be formed in the vertical member 102 and may be utilized to mounted the "L" bracket 100 to a tongue of a trailer in a similar manner as the "L" bracket 43 shown in FIGS. 2 and 3. The horizontal member 104 may include a horizontal surface 108. The horizontal member 104 may comprise a clamping member 110. Disposed on the horizontal surface 108 may be a friction lining 112. The friction lining 112 may be part of the clamping member 110. In other embodiments, the friction linings 112 may be omitted. Formed in the vertical member 102 may be a slot 114. Formed in the horizontal member 104 may be a bore 105.

A clamping member 116 may include a friction lining 118 disposed on a bottom surface of the clamping member 116. But, in other embodiments, the friction lining 118 may be omitted. The clamping member 116 may further comprise a projection member 120 extending laterally from an end the clamping member 116. The projection member 120 may comprise a bore 122 for receiving a pin 124. The projection member 120 may be sized and dimensioned to engage the slot 114 formed in the vertical member 102 of the "L" bracket 100. The projection member 116 may further comprise a bore 126.

A fastener 128 may include a shaft 130 and a threaded end 132. The shaft 130 of the fastener 128 may be installed through bores 105 and 126 such that its threaded end 132 may engage a nut 134. A lever 136 may be utilized to allow a user to tighten the nut 134 onto the threaded end 132 of the fastener 128. The lever 136 may further be utilized to variably adjust the clamping force on the spring arm 41. A resilient member 138 may be installed onto the shaft 130 of the fastener 128 between a top surface 140 of the coupling member 116 and the nut 134. The purpose and function of the resilient member 138 may be to bias the coupling member 116 against a spring arm 41 (not explicitly shown).

It will be appreciated that clamping member 116 may be moveable with respect to "L" bracket or support member 100, and that clamping member 116 may be removably attachable to support member 100, as described and contemplated herein.

Figure 7:
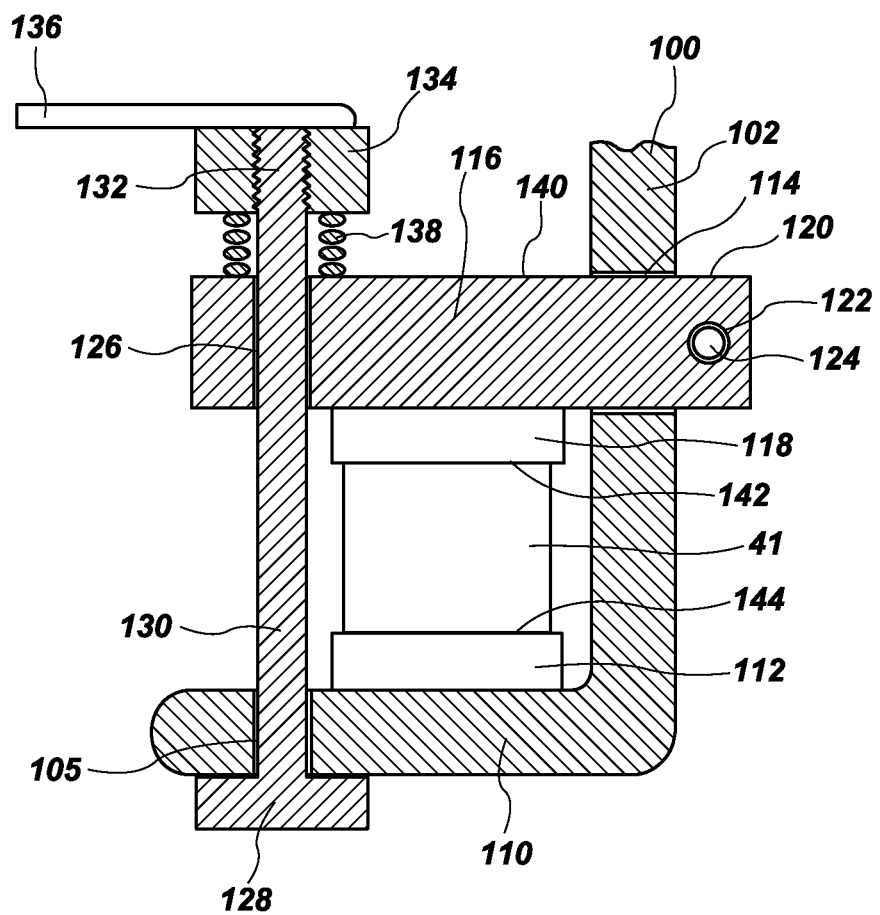
FIG. 7 is a cross sectional view of the embodiment shown in FIG. 6.

Referring now to FIG. 7, there is shown a fragmentary cross sectional view taken along a similar section A-A as shown in FIG. 2, but for the embodiment shown in FIG. 6. The projection member 120 of the clamping member 116 may be installed into the slot 114 formed in the vertical member 102 of the "L" bracket 100. The pin 124 may be inserted into the bore 122 on the projection member 120 of the clamping member 116. In this manner, the clamping member 116 may be disposed in a horizontal position.

The spring arm 41 may be clamped between the clamping member 110 and the clamping member 116. In particular, a top surface 142 of the spring arm 41 may be engaged by the friction lining 118. A bottom surface 144 of the spring arm 41 may be engaged by the friction lining 112. The clamping member 110 and the clamping member 116 may be clamped together using the fastener 128. In particular, the shaft 130 of the fastener 128 may be installed through bores 105 and 126. The threaded end 132 of the fastener 128 may engage the nut 134. The nut 134 may be tightened onto the threaded end 132 of the fastener 128 using the lever 136. Again, the lever 136 may be utilized to adjust the amount of frictional force applied to the spring arm 41. The fastener 128 may also operate to prevent the spring arm 41 from being dislocated from the "L" bracket 100.

The resilient member 138 may be installed onto the shaft 130 of the fastener 128 between the top surface 140 of the clamping member 116 and the nut 134. The positioning of the resilient member 138 biases the clamping member 116 against the spring arm 41. This biasing is particularly useful when the spring arm 41 is a tapered spring arm. The biasing of the clamping member 116 by the resilient member 138 ensures that the frictional linings 112 and 118 remain in contact with a tapered spring arm. Thus, it will be understood that the function of the resilient member 138 is to take up variable clearance with tapered spring arms. In one embodiment, the resilient member 138 may comprise a coiled spring. It will be appreciated that the use of the resilient member 138 may be optional.

It will be noted that the friction linings 54 and 56 shown in FIGS. 4 and 5 may be optional and that no friction linings are required. Likewise, the friction linings 112 and 118 shown in FIGS. 6 and 7 may be optional, and that no friction linings are required. That is the spring arm 41 may directly engage the clamping members without any intervening materials. Further, the lever 72 shown in FIGS. 4 and 5 and the lever 136 shown in FIGS. 6 and 7 may be used to vary the clamping force applied to the spring arm 41.

Figure 8A:
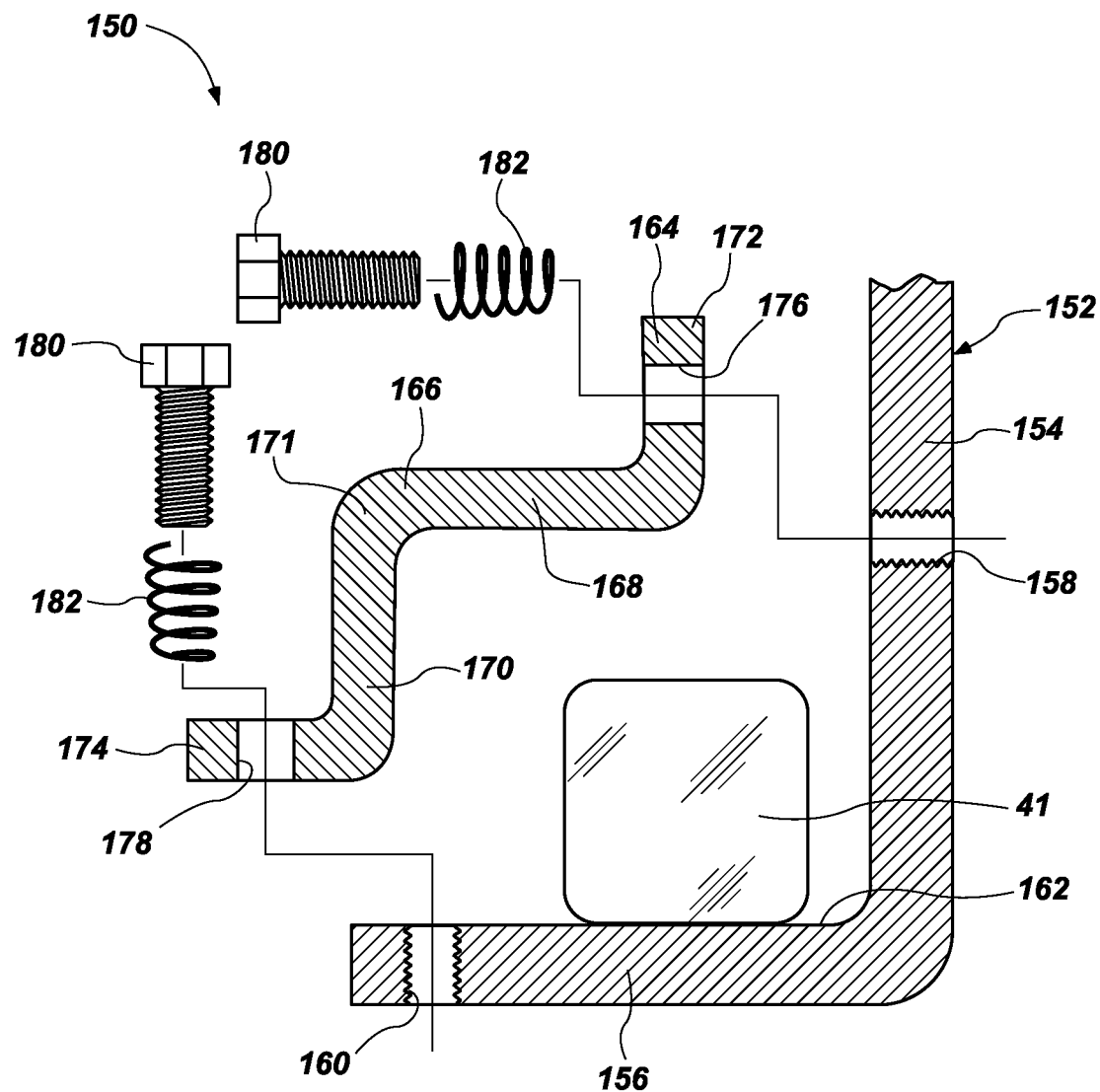
FIG. 8A is a fragmentary cross-sectional view of another embodiment of the present disclosure.

Referring now to FIG. 8A, there is depicted a fragmentary cross-sectional view of a clamping apparatus 150 according to an exemplary embodiment of the present disclosure. The apparatus 150 may comprise an "L" bracket 152 having a vertical member 154 and a horizontal member 156. A threaded bore 158 may be formed in the vertical member 154 and another threaded bore 160 may be formed in the horizontal member 156. A spring arm 41 may be disposed on a horizontal surface 162 of the horizontal member 156.

A clamping member 164 may comprise a body portion 166 having a horizontal portion 168 and a vertical portion 170 that may intersect each other at approximately a ninety degree bend 171. Disposed on either side of the body portion 166 are tabbed portions 172 and 174. Formed in the tabbed portions 172 and 174 are bores 176 and 178, respectively. Fasteners 180 may be inserted through the bores 176 and 178 such that threaded shafts of the fasteners 180 may engage the bores 158 and 160 to thereby secure the clamping member 164 to the "L" bracket 152. Resilient members 182 may allow for the use of tapered spring arms as explained previously.

Figure 8B:
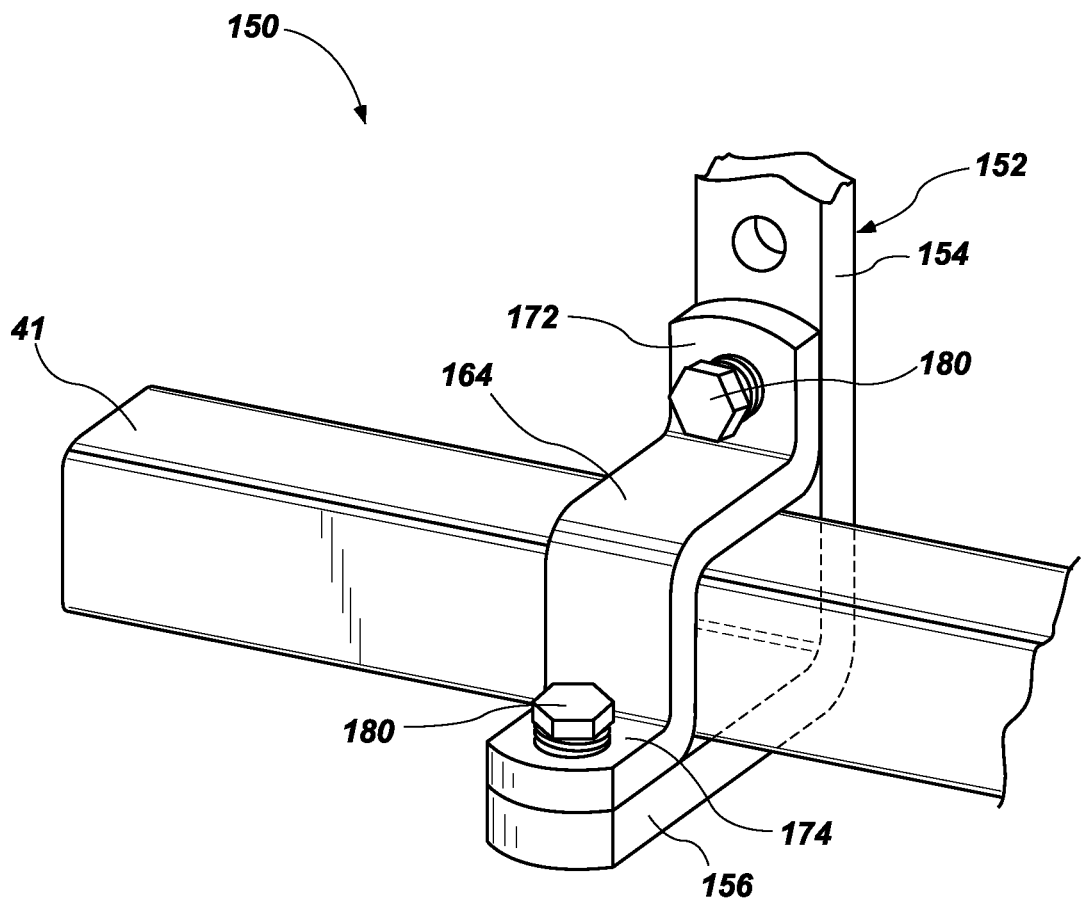
FIG. 8B is a fragmentary assembled view of the embodiment shown in FIG. 8A.

Referring now to FIG. 8B, there is shown an assembled view of the apparatus 150 shown in FIG. 8A. As can be observed, the clamping member 164 may be clamped to the spring arm 41 by the fasteners 180 such that the tabbed portions 172 and 174 may engage the vertical member 154 and the horizontal member 156, respectively. It will be noted from FIG. 8B that an additional three (3) surfaces of the spring arm 41 are now subject to a frictional force due to the use of the clamping member 164. The fasteners 180 may be variably tightened and loosened to thereby increase and decrease the frictional force applied to the spring arm 41.

Figure 8C:
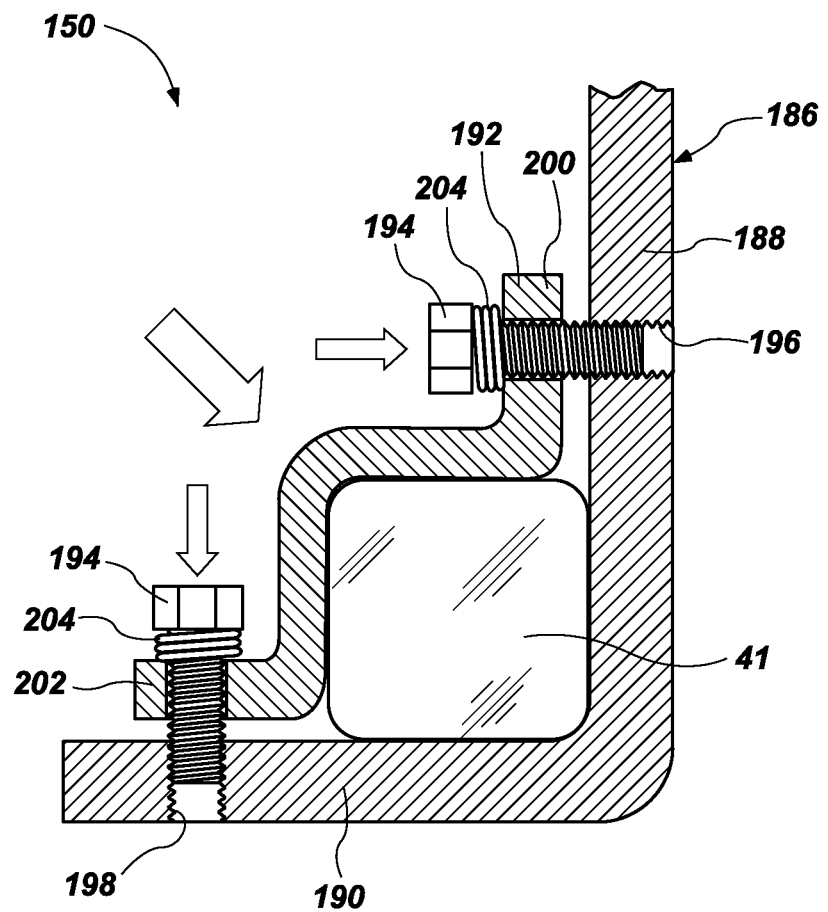
FIG. 8C is a fragmentary view of another embodiment of the present invention.

Referring now to FIG. 8C, there is shown another embodiment of a clamping apparatus 184 according to another exemplary embodiment the present disclosure. The apparatus 184 comprises an "L" bracket 186 having a vertical member 188 and a horizontal member 190. A clamping member 192 is clamped on the spring arm 41 by fasteners 194 that engage bores 196 and 198 in the vertical member 188 and the horizontal member 190, respectively. Tabbed portions 200 and 202 of the clamping member 192 do not directly engage the vertical member 188 and the horizontal member 190, respectively, of the "L" bracket 186. That is, the tabbed portions 200 and 202 of the clamping member 192 may be separated from the "L" bracket 186 by a gap. Resilient members 204 installed onto shafts of the fasteners 194 may allow a variable distance between the clamping member 192 and the "L" bracket 186 to thereby permit the user of a tapered spring arm. The fasteners 194 may be variably tightened and loosened to thereby increase and decrease the frictional force applied to the spring arm 41.

It will be appreciated that clamping members 164 and 184 of FIGS. 8A-8C may be moveable with respect to "L" bracket or support members 150 and 186, and that clamping members 164 and 184 may be removably attachable to support members 150 and 186, as described and contemplated herein.

Figure 9A:
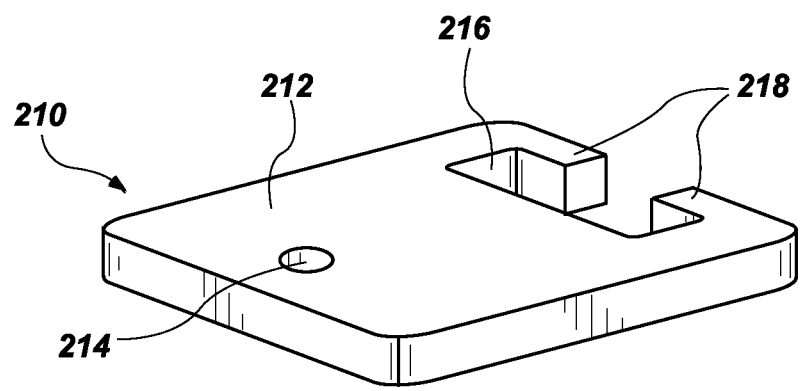
FIG. 9A is an embodiment of a clamping member.
Figure 9B:
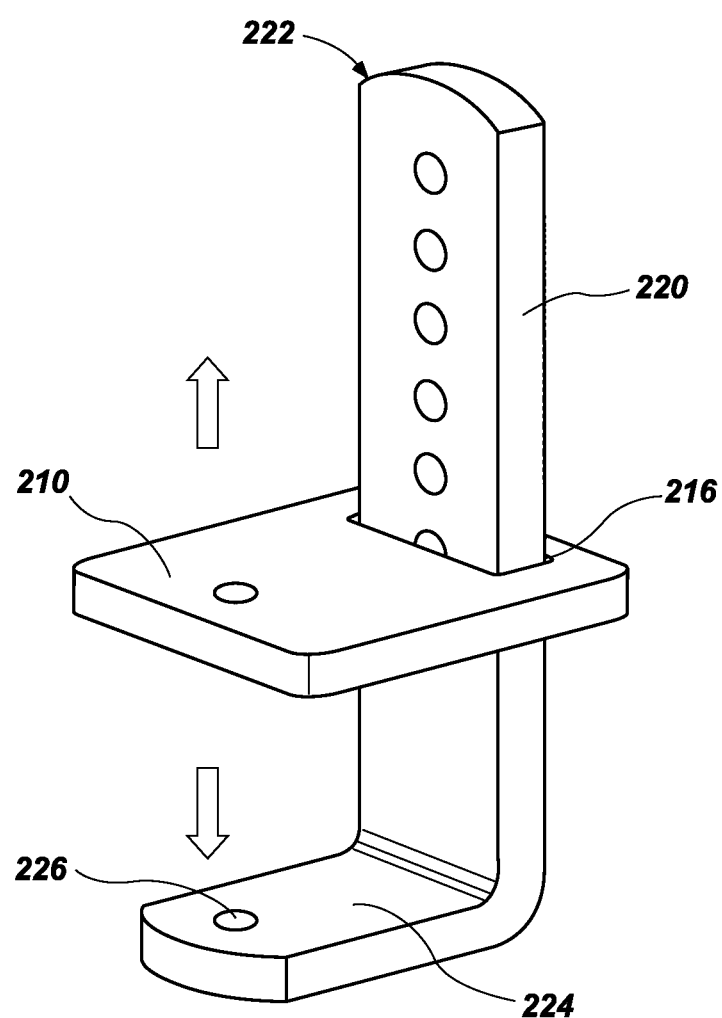
FIG. 9B depicts the clamping member shown in FIG. 9A installed onto an "L" bracket.
Figure 9C:
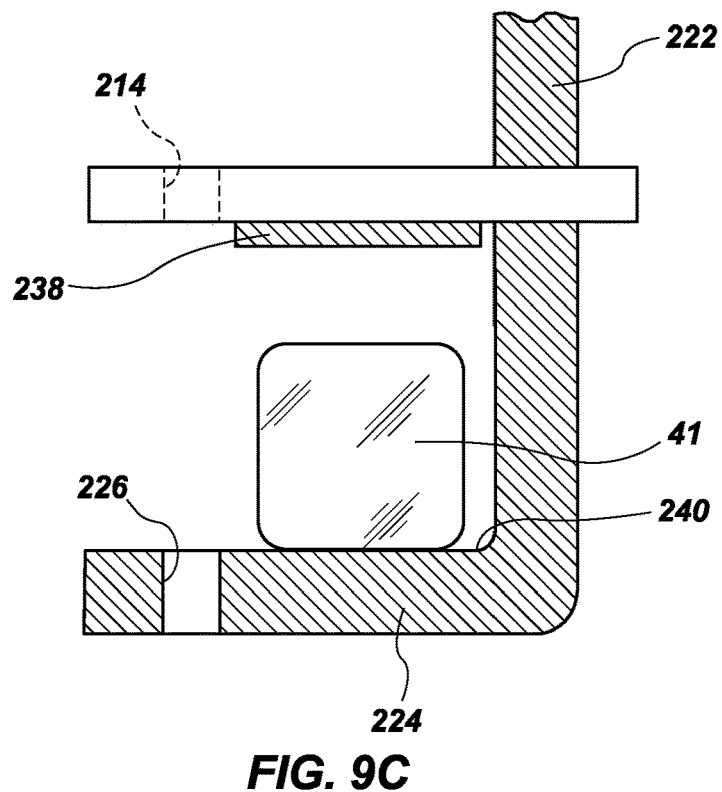
FIG. 9C is a fragmentary cross sectional view of the embodiment shown in FIGS. 9A and 9B in an unclamped position.
Figure 9D:
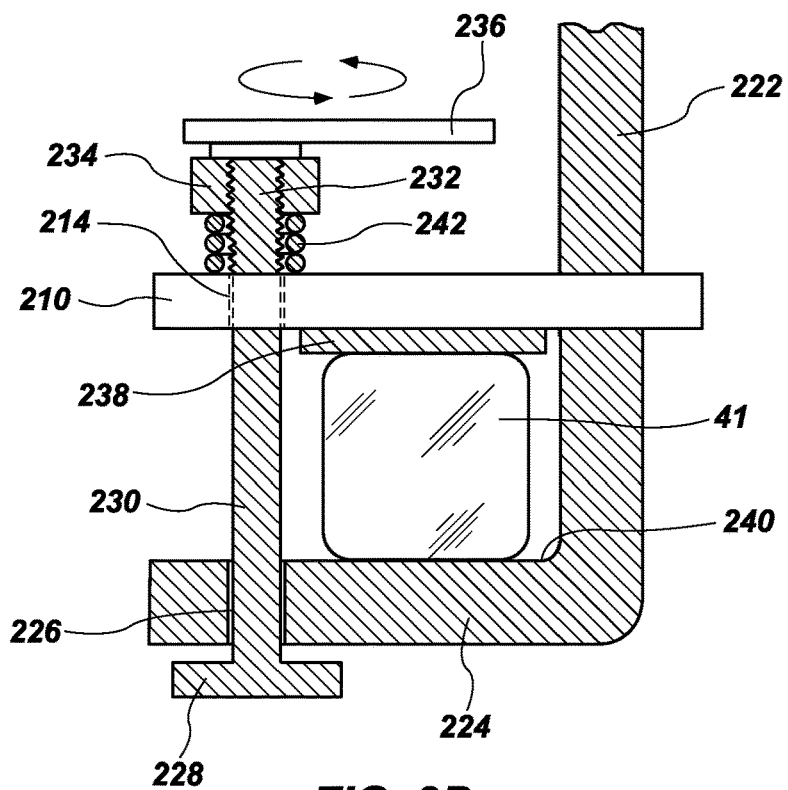
FIG. 9D is a fragmentary cross sectional view of the embodiment shown in FIGS. 9A and 9B in a clamped position.

Referring now to FIG. 9A, there is shown a perspective view of a clamping member 210. The clamping member 210 may comprise a surface 212 having a bore 214 formed therein. A slot 216 may be formed in the surface 212. A pair of arms 218 may form at least part of the slot 216. As shown in FIG. 9B, the slot 216 may be sized and dimensioned for slidably engaging a vertical member 220 of an "L" bracket 222. A horizontal member 224 of the "L" bracket 222 may comprise a bore 226. As shown in FIGS. 9C and 9D, a shaft 230 of a fastener 228 may be installed into bores 226 and 214 such that a threaded end 232 of the fastener 228 may engage a nut 234. A lever 236 extending from the nut 234 may allow for varying a frictional force applied to the spring arm 41 by the clamping member 210. In particular, tightening the nut 234 with the lever 236 causes the clamping member 210 to apply, via a friction lining 238, a frictional or clamping force to a top surface of the spring arm 41. Through the same process, an increased frictional or clamping force is also applied to a bottom surface of the spring arm 41 by a surface 240 of the horizontal member 224. Thus, it will be appreciated that the horizontal member 224 of the "L" bracket 222 is also a clamping member. A resilient member 242 may allow for the use of tapered spring arms as previously described. It will be noted that the shaft 230 of the fastener 228 may prevent the spring arm 41 from laterally disengaging the "L" bracket 222.

Figure 10A:
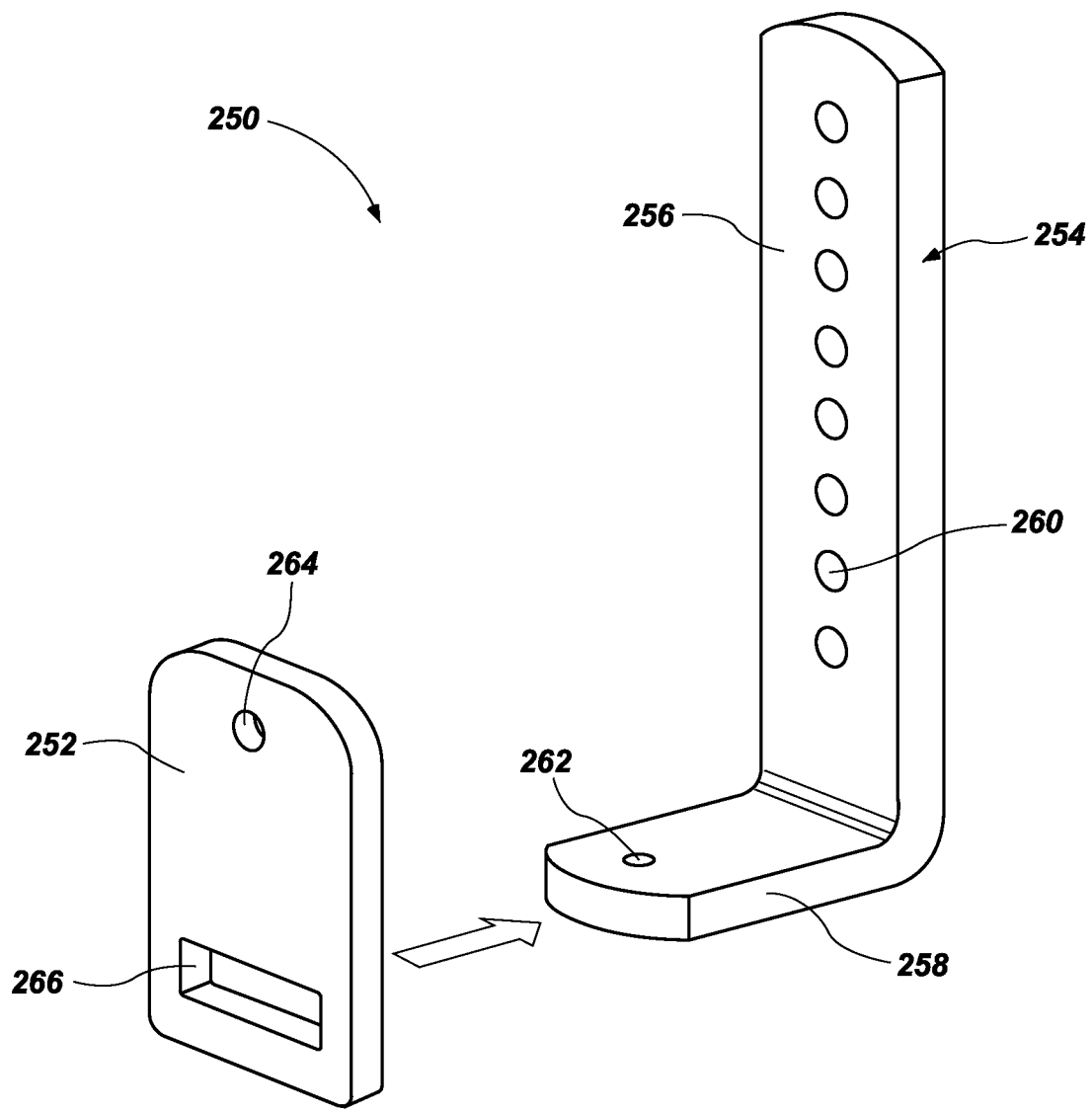
FIG. 10A is an exploded view of a clamping member and an "L" bracket.
Figure 10B:
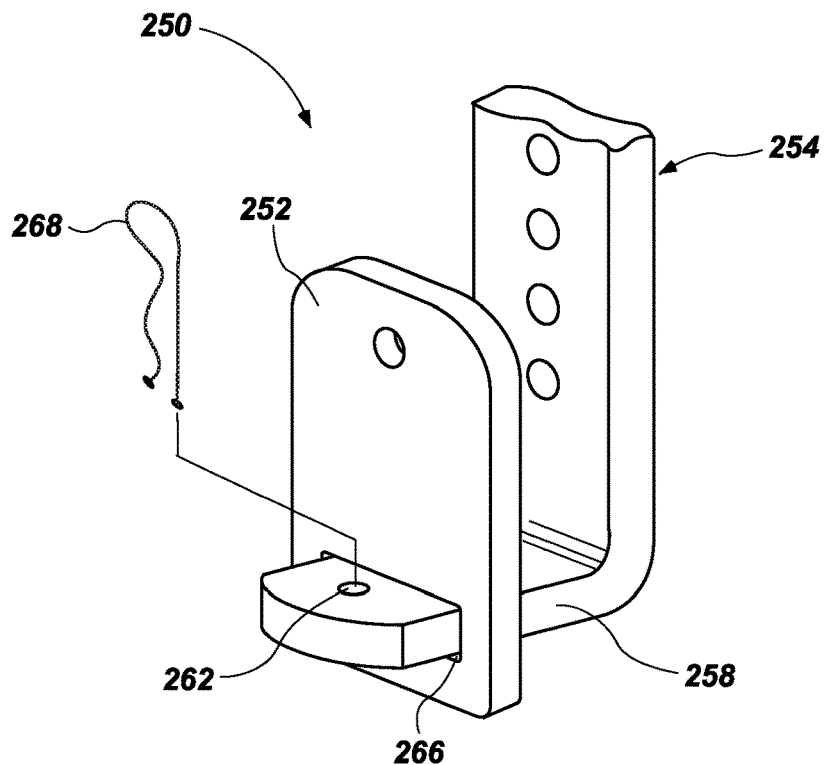
FIG. 10B is a fragmentary view of the clamping member shown in FIG. 10A installed onto the "L" bracket.
Figure 10C:
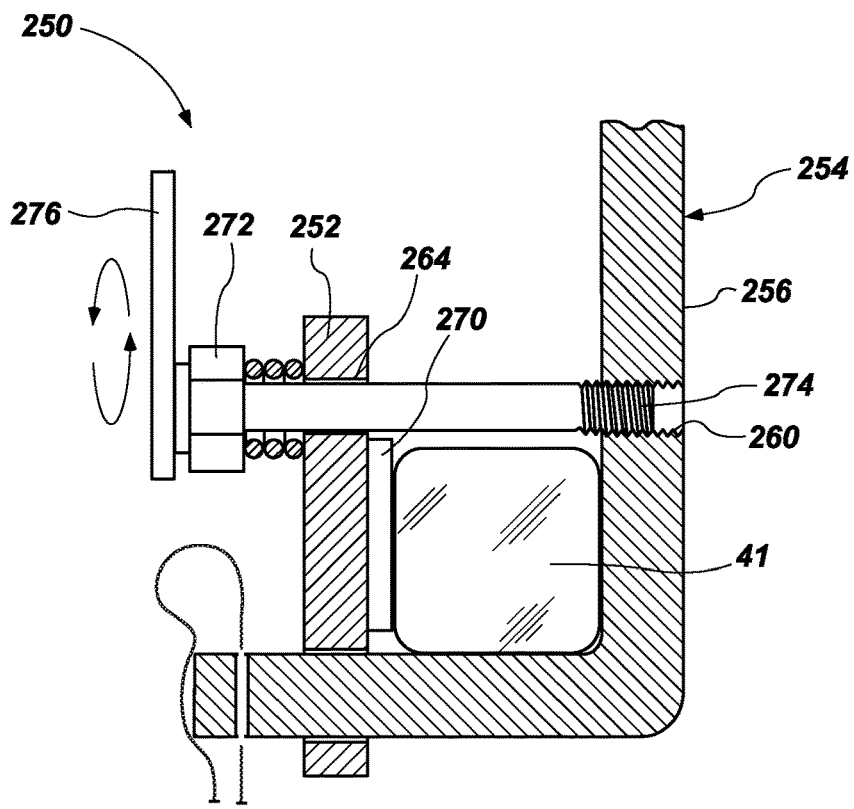
FIG. 10C is a fragmentary cross sectional view of the embodiment shown in FIG. 10A with the clamping member installed onto the "L" bracket.

Referring now to FIG. 10A, there is shown a clamping apparatus 250 having a clamping member 252 and an "L" bracket 254. The "L" bracket 254 may comprise a vertical member 256 and a horizontal member 258. Formed in the vertical member 256 may be a threaded bore 260. A second bore 262 may be formed in the horizontal member 258 of the "L" bracket 254. The clamping member 252 may comprise a bore 264 and a slot 266. As shown in FIG. 10B, the slot 266 of the clamping member 252 is sized and configured to slidably engage the horizontal member 258 of the "L" bracket 254. A pin 268 may slidably engage the bore 262 in the horizontal member 258 to thereby secure the clamping member 252 onto the horizontal member 258 of the "L" bracket 254. As shown in FIG. 10C, a cross sectional view of the clamping apparatus 250, the spring arm 41 is clamped against the vertical member 256 of the "L" bracket 254 by the clamping member 252. In particular, a friction lining 270 disposed on the clamping member 252 may engage a surface of the spring arm 41. A threaded end 274 of a fastener 272 may engage the threaded bore 260 to thereby secure the clamping member 252. A lever 276 attached to the fastener 272 may be utilized to vary the amount of clamping or frictional force applied to the spring arm 41 by the clamping member 252. It will be appreciated that the use of the clamping member 252 causes an additional two surfaces of the spring arm 41 to be subjected to a clamping or frictional force.

It will be appreciated that clamping members 210 and 252 of FIGS. 9A-10C may be moveable with respect to "L" bracket or support members 222 and 254, and that clamping members 210 and 252 may be removably attachable to support members 222 and 254, as described and contemplated herein.

Figure 11A:
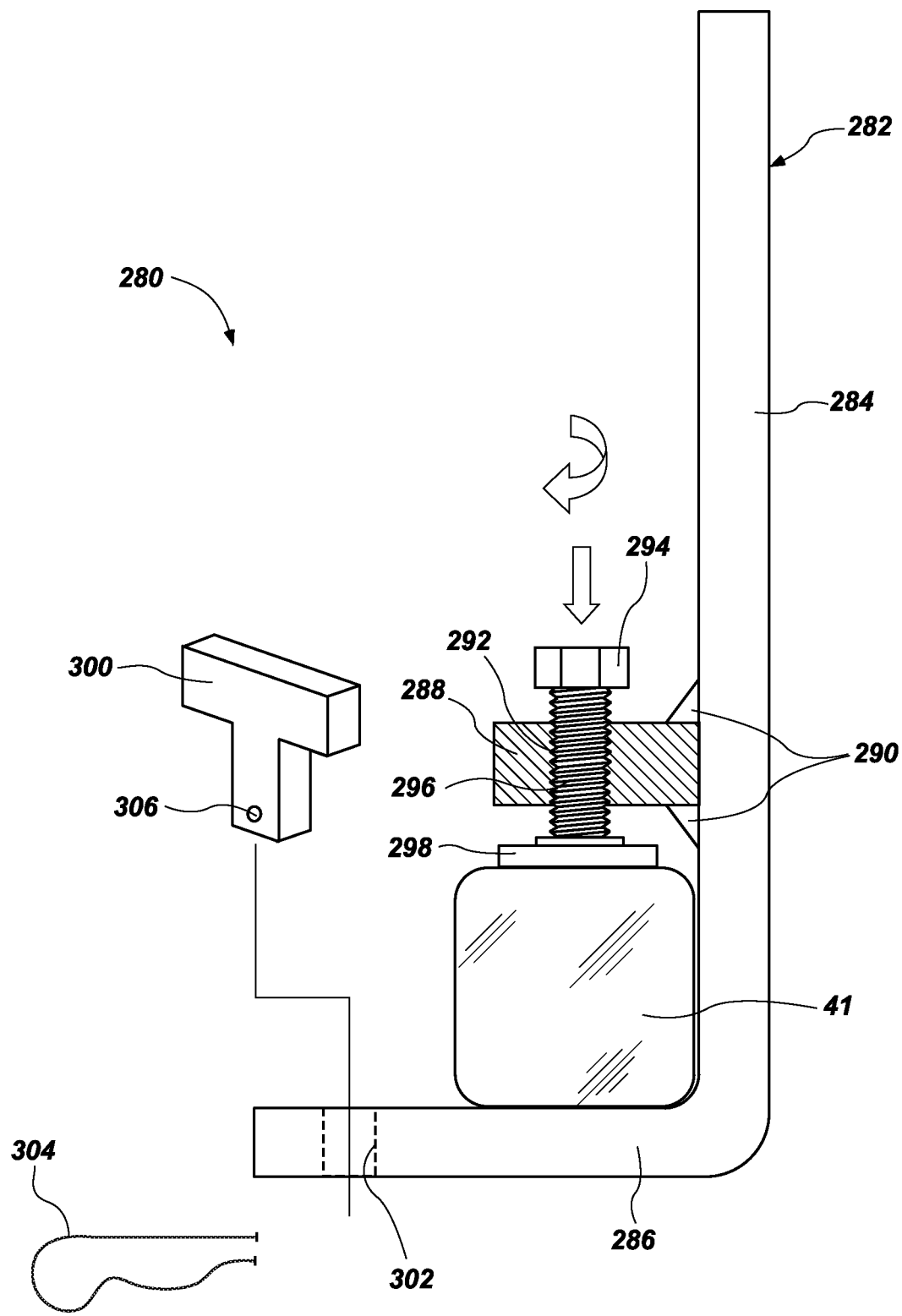
FIG. 11A is a cross sectional view of another embodiment of the present disclosure.
Figure 11B:
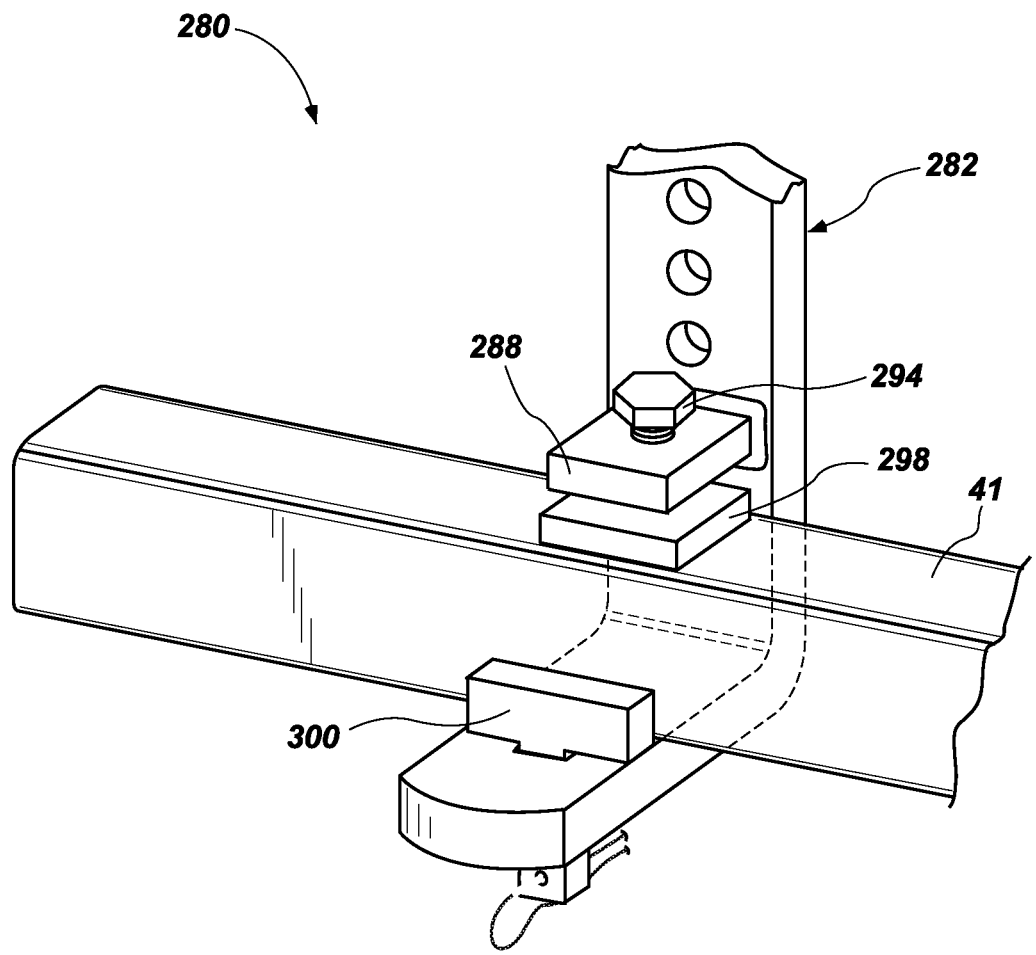
FIG. 11B is a perspective view of the embodiment shown in FIG. 11A.

Referring now to FIG. 11A, there is shown another embodiment of a clamping apparatus 280 pursuant to the present disclosure. The clamping apparatus 280 comprises an "L" bracket 282 having a vertical member 284 and a horizontal member 286. Extending from the vertical member 284 of the "L" bracket 282 is a projection member 288. The projection member 288 may be attached to the vertical member 284 by welds 290. A threaded bore 292 may extend vertically through the projection member 288. A fastener 294 having a threaded shaft 296 may be installed into the bore 292 such that the threaded shaft 296 engages the threads of the bore 292. Disposed on a terminal end of the fastener 294 is a clamping member 298. Using the fastener 294, a clamping or frictional force may be imposed on a top surface of the spring arm 41. A retention member 300 may be inserted into a slot 302 formed in the horizontal member 286 of the "L" bracket 282. A pin 304 may be inserted into a bore 306 in the retention member 300 once the retention member 300 has been inserted through the slot 302. It will be appreciated that the retention member 300 is operable to prevent the spring arm 41 from disengaging the horizontal member 286. As shown in FIG. 11B, where like reference numerals depict like components, the spring arm 41 may be clamped by the clamping member 298. The fastener 294 may be tightened or loosened to thereby vary the clamping or frictional force on the spring arm 41.

It will be appreciated that clamping member 298 may be moveable with respect to "L" bracket or support member 282, and that clamping member 298 may be removably attachable to support member 282, as described and contemplated herein.

Figure 12A:
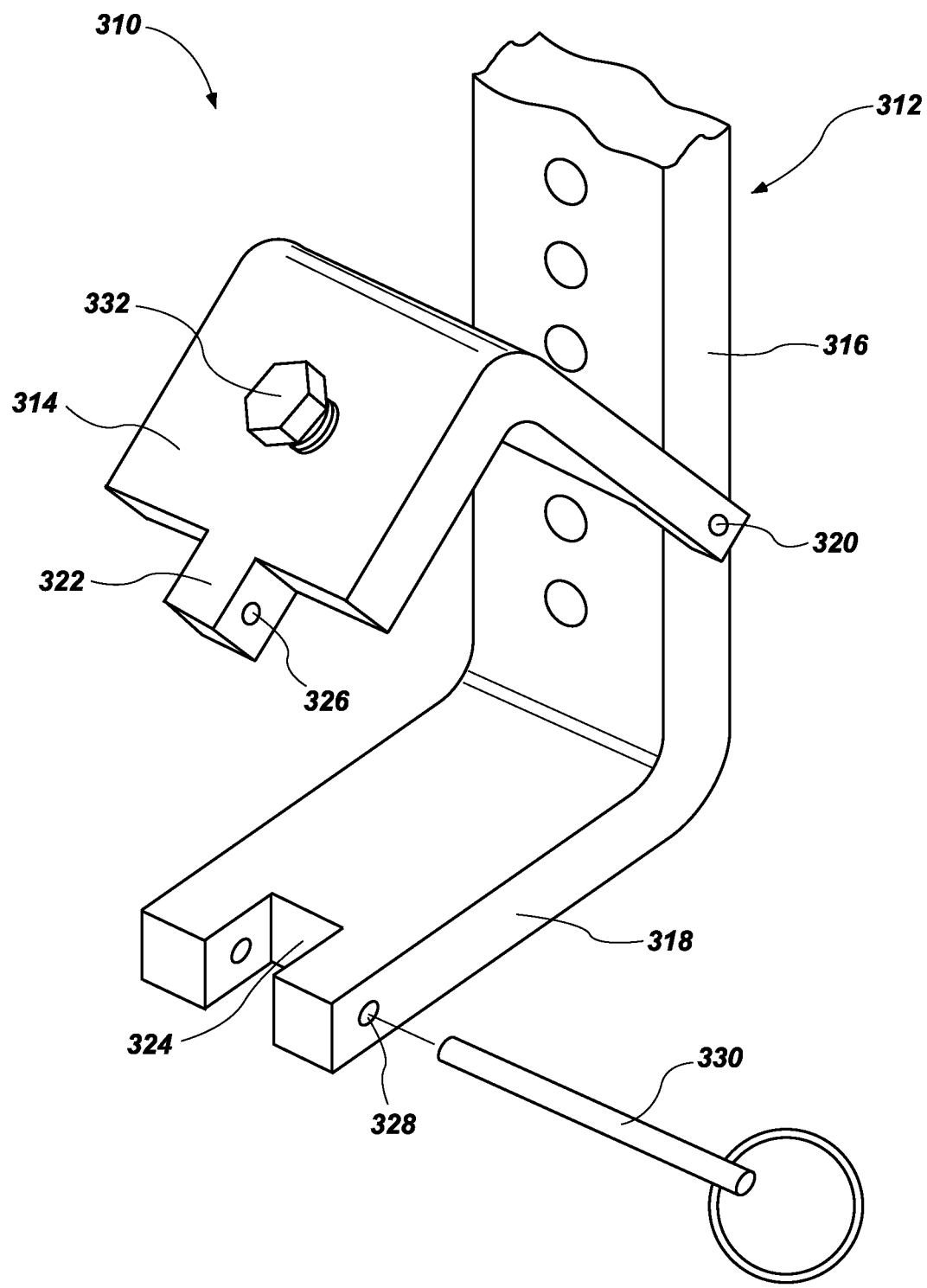
FIG. 12A-12C depict other exemplary embodiments of the present disclosure.

Referring now to FIG. 12A, there is depicted a clamping apparatus 310 that may comprise an "L" bracket 312 and a clamping member 314. The "L" bracket 312 may comprise a vertical member 316 and a horizontal member 318. The clamping member 314 may be pivotally attached to the vertical member 316 of the "L" bracket 312 by a pin member 320. A projection member 322 extending from the clamping member 314 may engage a notch 324 formed in the horizontal member 318 of the "L" bracket 312. A bore 326 may be formed in the projection member 322. Another bore 328 may be formed in the horizontal member 318. When the clamping member 314 is closed onto a spring arm (not shown), the projection member 322 engages the notch 324 such that the bores 326 and 328 are in alignment. A pin 330 may be inserted into the bores 326 and 328 simultaneously to thereby secure the clamping member 314 in a clamping position. A fastener 332 may be used to apply a clamping or frictional force onto a spring arm (not shown). The fastener 332 may take the form of that shown in FIG. 13A as described hereinafter.

Figure 12B:
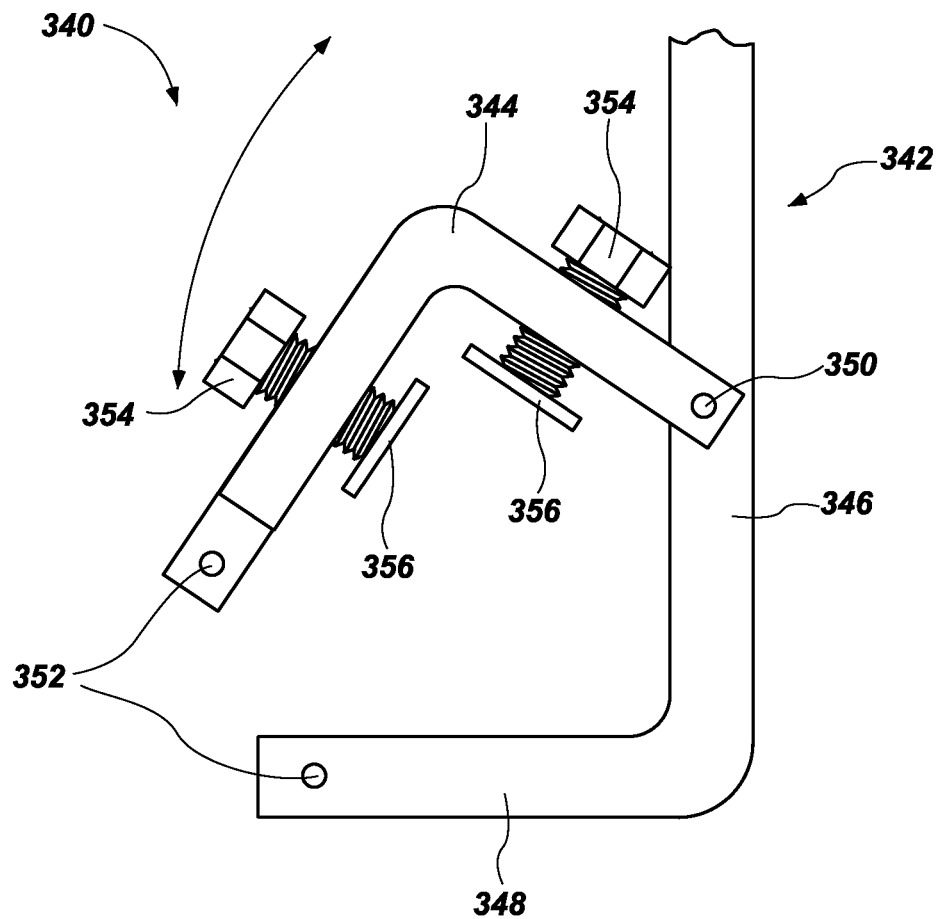

Referring now to FIG. 12B, there is depicted a clamping apparatus 340 that may comprise an "L" bracket 342 and a clamping member 344. The "L" bracket 342 may comprise a vertical member 346 and a horizontal member 348. The clamping member 344 may be pivotally attached to the vertical member 346 of the "L" bracket 342 by a pin member 350. The clamping member 344 may be pivotally closed onto a spring arm (not shown). A pin (not shown) may be inserted into bore 352 to thereby secure the clamping member 344 in the closed or clamping position. Fasteners 354 may be variably adjusted to apply friction linings 356 to a surface of the spring arm (not shown). The fasteners 354 may take the form of those described in FIG. 13B.

Figure 12C:
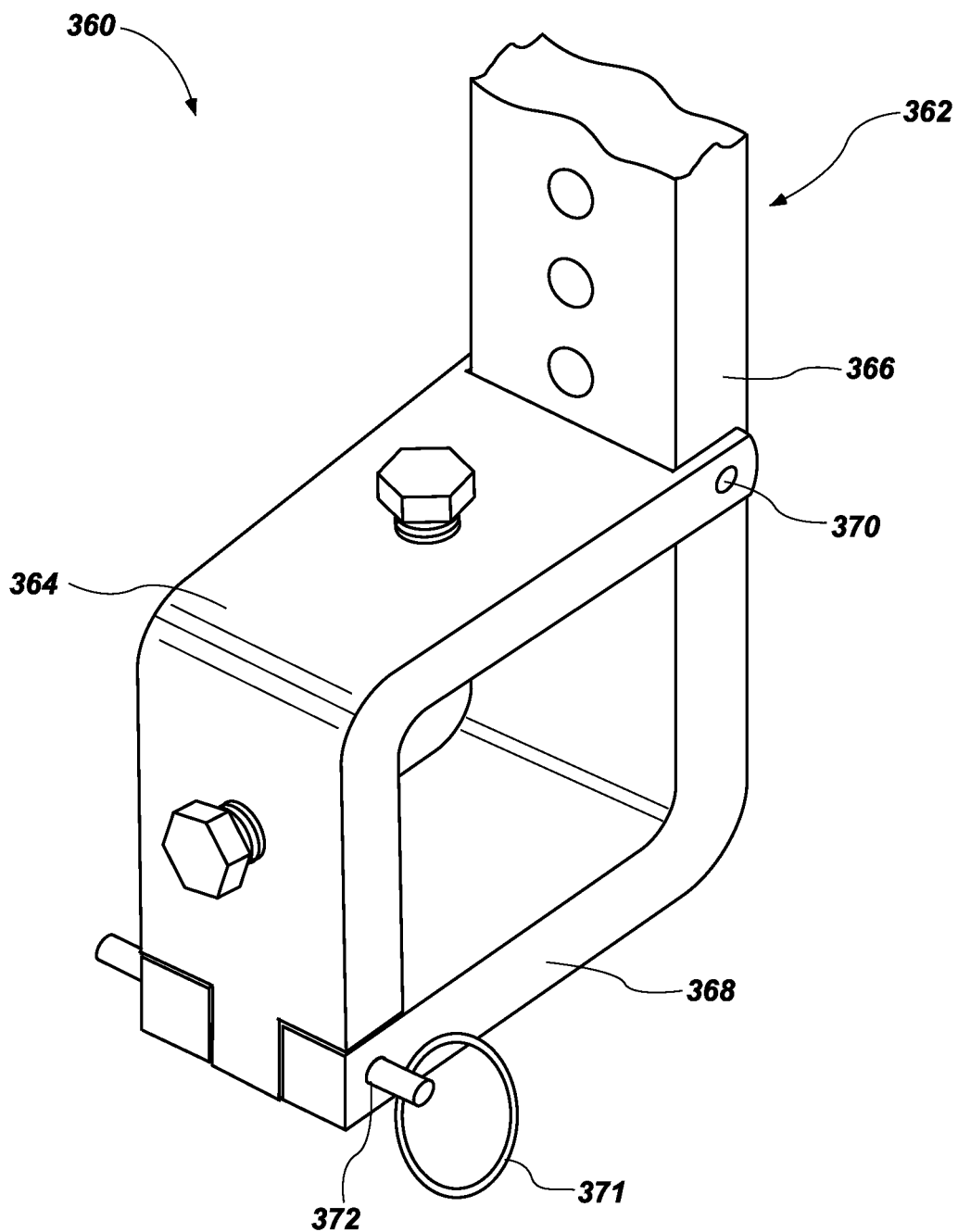

Referring now to FIG. 12C, there is depicted a clamping apparatus 360 that may comprise an "L" bracket 362 and a clamping member 364. The "L" bracket 362 may comprise a vertical member 366 and a horizontal member 368. The clamping member 364 may be pivotally attached to the vertical member 366 of the "L" bracket 362 by a pin member 370. The clamping member 364 may be pivotally closed onto a spring arm (not shown). A pin 371 may be inserted into a bore 372 to thereby secure the clamping member 364 in the closed or clamping position. In this embodiment, the spring arm (not shown) may be engaged by an underside surface of the clamping member 364 to thereby increase friction on the spring arm (not shown).

It will be appreciated that clamping members 344 and 364 may be moveable with respect to "L" bracket or support members 342 and 362, and that clamping members 344 and 364 may be removably attachable to support members 342 and 362, as described and contemplated herein.

Figure 13A:
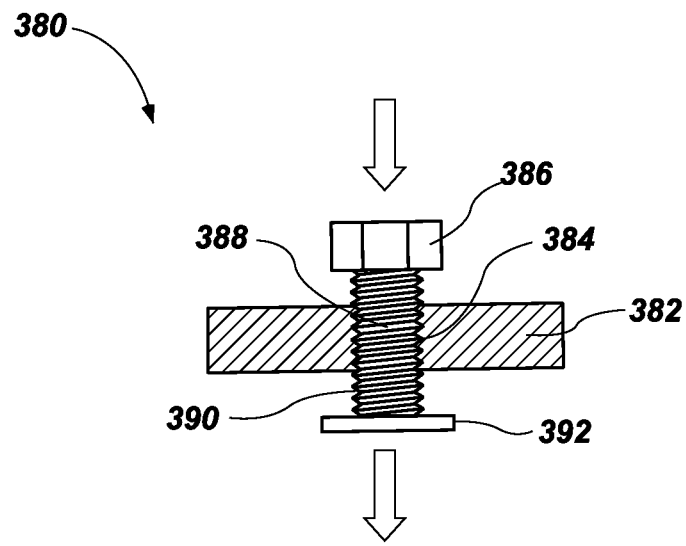
FIG. 13A depicts an embodiment of a clamping member.

Referring now to FIG. 13A, there is shown a clamping mechanism 380 that may apply a clamping force or a frictional force to a surface of a spring arm (not shown). The mechanism 380 may comprise a base member 382 having a threaded bore 384 formed therein. A fastener 386 having a threaded shaft 388 may be installed into the threaded bore 384 of the base member 382. Attached to a terminal end 390 of the fastener 386 may be a friction lining 392. Tightening the fastener 386 into the bore 384 may cause an increased clamping or frictional force to be applied to a spring arm (not shown). Untightening the fastener 386 may cause a decreased clamping or frictional force to be applied to the spring arm (not shown).

Figure 13B:
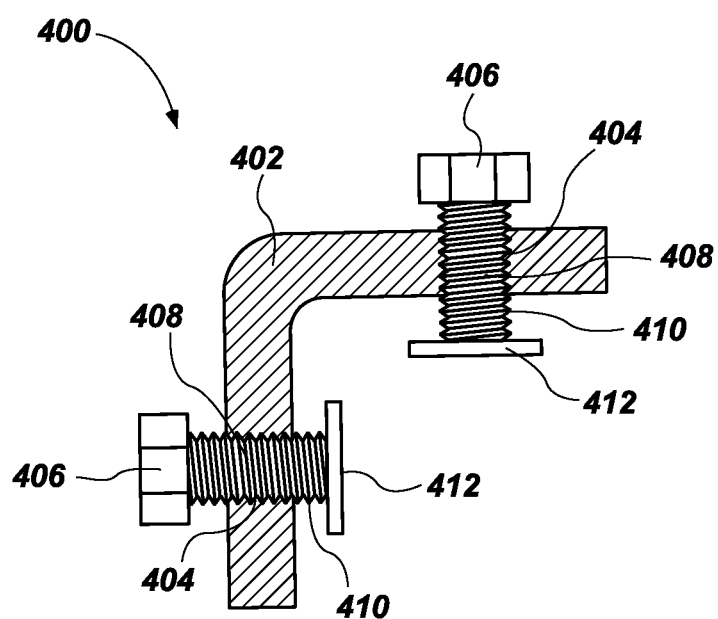
FIG. 13B depicts another embodiment of a clamping member.

Referring now to FIG. 13B, there is shown a clamping mechanism 400 that may apply clamping forces or frictional forces to a spring arm (not shown). The mechanism 400 may comprise a base member 402 having a pair of threaded bores 404 formed therein. Fasteners 406 each having a threaded shaft 408 may be installed into the threaded bores 404 of the base member 402. Attached to a terminal end 410 of each of the fasteners 406 may be a friction lining 412. Tightening the fasteners 406 into the bores 404 may cause an increased clamping or frictional force to be applied to two orthogonal surfaces of a spring arm (not shown) by the friction linings 412.

Figure 14A:
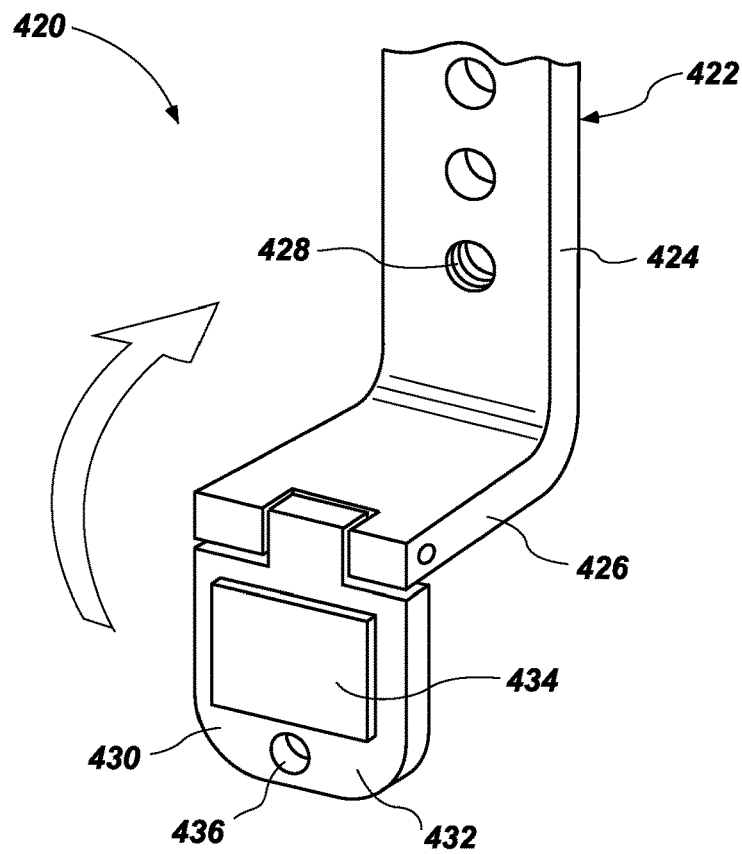
FIG. 14A is a fragmentary view of another embodiment of the present disclosure.
Figure 14B:
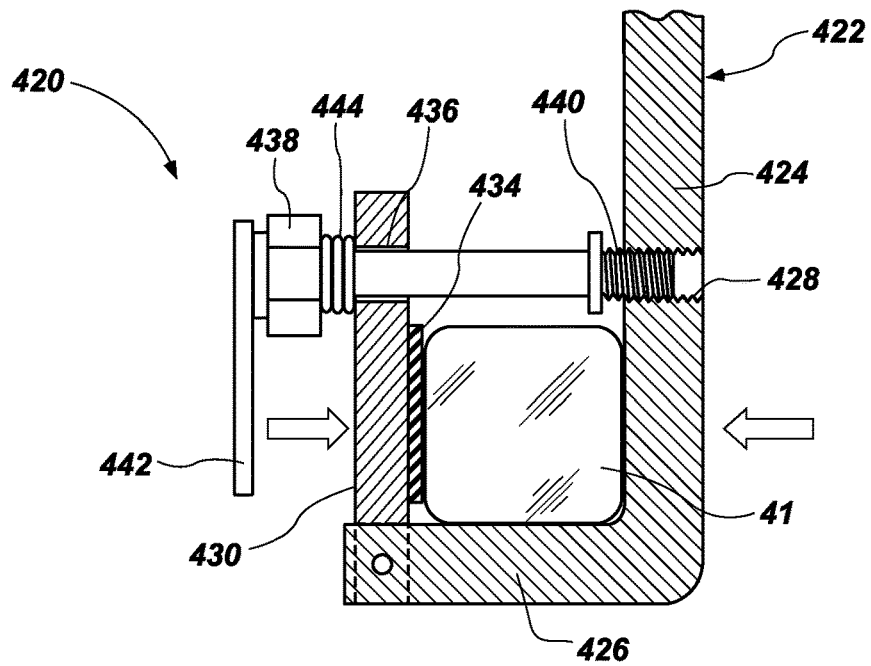
FIG. 14B is a fragmentary cross sectional view of the embodiment shown in FIG. 14A in a clamped configuration.
Figure 14C:
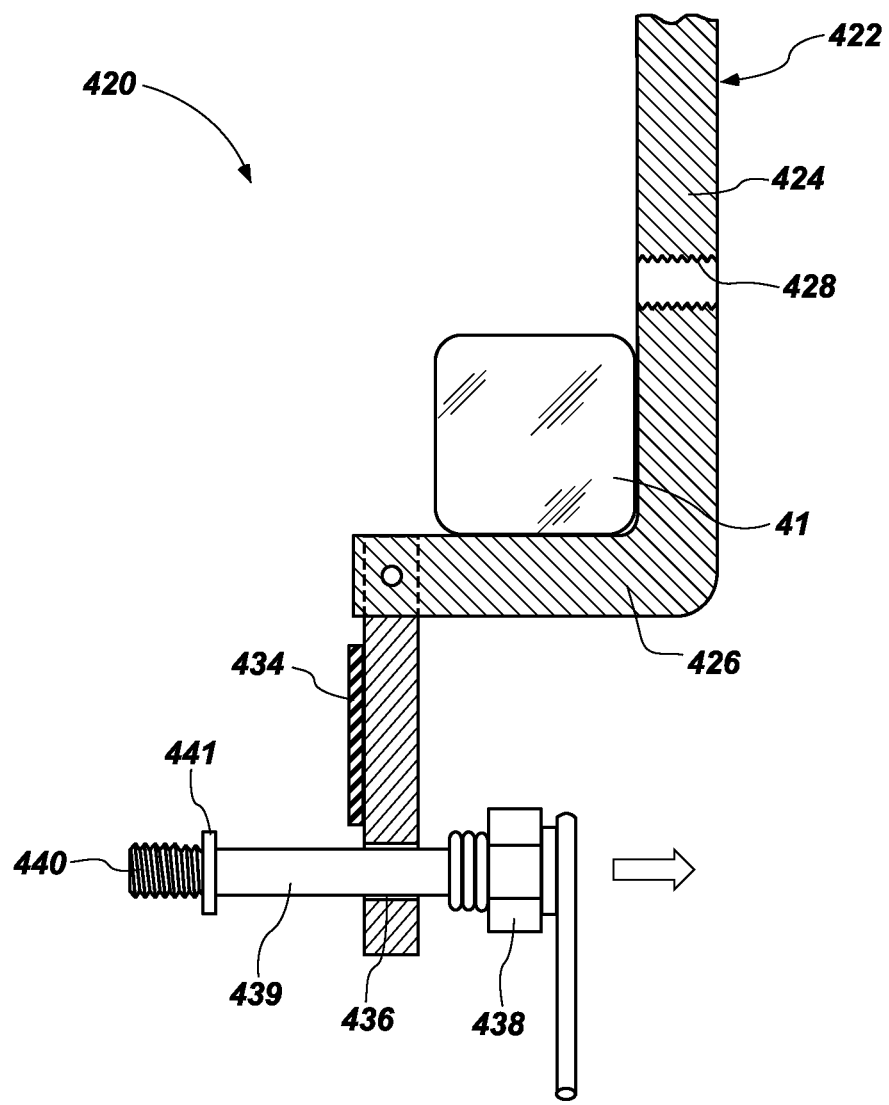
FIG. 14C is a fragmentary cross sectional view of the embodiment shown in FIG. 14A in an unclamped configuration.

Referring now to FIG. 14A, there is shown a clamping apparatus 420 pursuant to another embodiment of the present disclosure. The clamping apparatus 420 may comprise an "L" bracket 422 having a vertical member 424 and a horizontal member 426. A threaded bore 428 may be formed in the vertical member 424 of the "L" bracket 422. Pivotally attached to a terminal end of the horizontal member 426 is a clamping member 430. Disposed on a surface 432 of the clamping member 430 may be a friction lining 434. A bore 436 may also be formed through the clamping member 430. As shown in FIG. 14B, the clamping member 430 may be pivoted upwards such that the friction lining 434 engages a surface of the spring arm 41. A fastener 438 may be inserted into the bore 436 such that a threaded end 440 of the fastener 438 may engage the bore 428. A lever 442 attached to the fastener 438 may permit variable adjustment of the clamping or frictional force applied to the spring arm 41. A resilient member 444 may allow for the use of tapered spring arms as previously explained. FIG. 14C depicts the clamping apparatus 420 in an unclamped position where like reference numerals depict the same components. It will be noted that a shaft 439 of the fastener 438 may slide freely in the bore 436 and be prevented from disengaging the bore 436 by a stop 441. The use of the stop 441 may prevent the fastener 438 from being lost.

Figure 15:
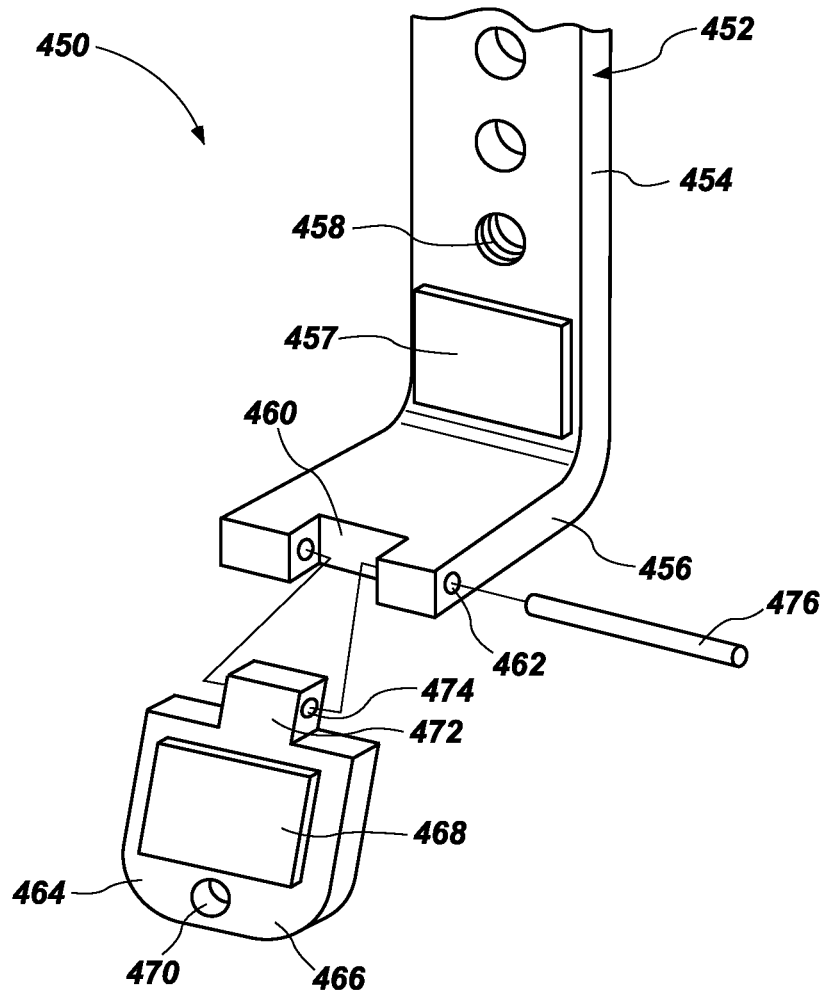
FIG. 15 is a fragmentary exploded view of another embodiment of the present disclosure.

Referring now to FIG. 15, there is shown a clamping apparatus 450 pursuant to another exemplary embodiment of the present disclosure. The clamping apparatus 450 may comprise an "L" bracket 452 having a vertical member 454 and a horizontal member 456. A friction lining 457 may be disposed on the vertical member 454. A threaded bore 458 may be formed in the vertical member 454 of the "L" bracket 452. A notch 460 may be formed in the horizontal member 456 of the "L" bracket 452. A bore 462 may be formed in the horizontal member 456 of the "L" bracket 452.

A clamping member 464 may comprise a surface 466 having a friction lining 468. A bore 470 may also be formed in the clamping member 464. The clamping member 464 may further comprise a projection member 472 having a bore 474. The projection member 472 may be configured and adapted to be inserted into the notch 460 such that bores 474 and 462 are in alignment. A pin 476 may be inserted into the bores 462 and 474 to thereby pivotally secure the clamping member 464 to the horizontal member 456 of the "L" bracket 452. When the clamping member 464 is installed onto the "L" bracket 452, it may be rotated such that the friction linings 468 and 457 engage opposite sides of a spring arm (not shown). A fastener (not shown) may be inserted through bores 458 and 470 to thereby secure the clamping member 464 in a clamping position.

Figure 16:
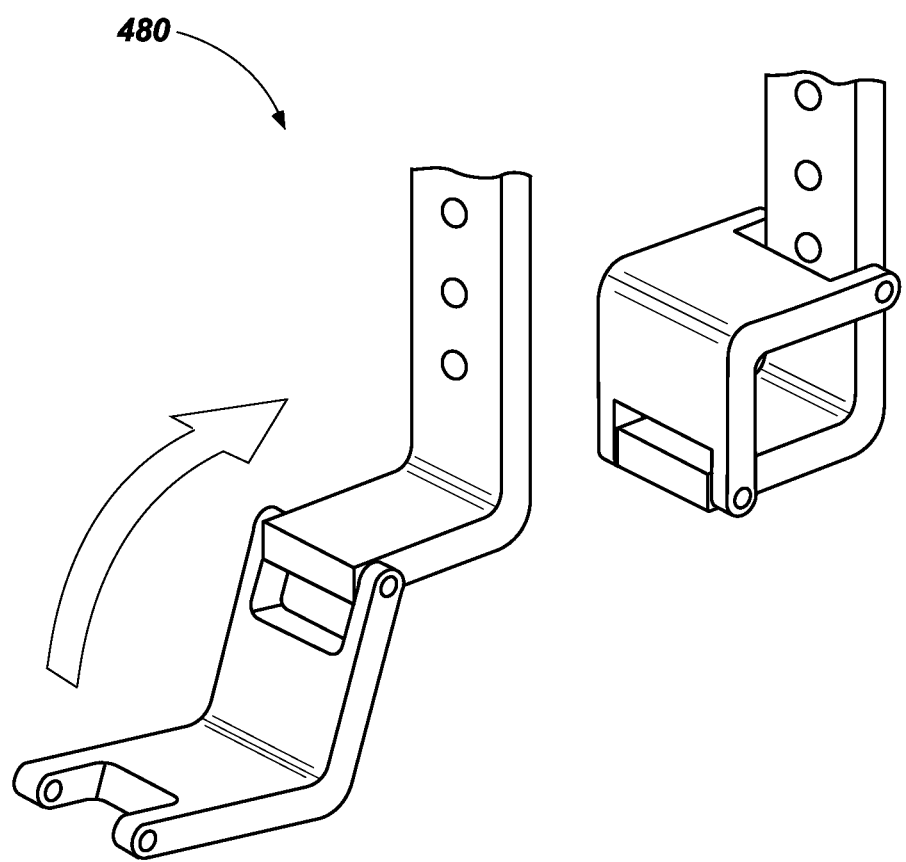
FIG. 16 is a view of another embodiment of the present disclosure.

Referring now to FIG. 16, there is shown a clamping apparatus 480 pursuant to an embodiment of the present disclosure in a clamped position and an unclamped position.

Figure 17:
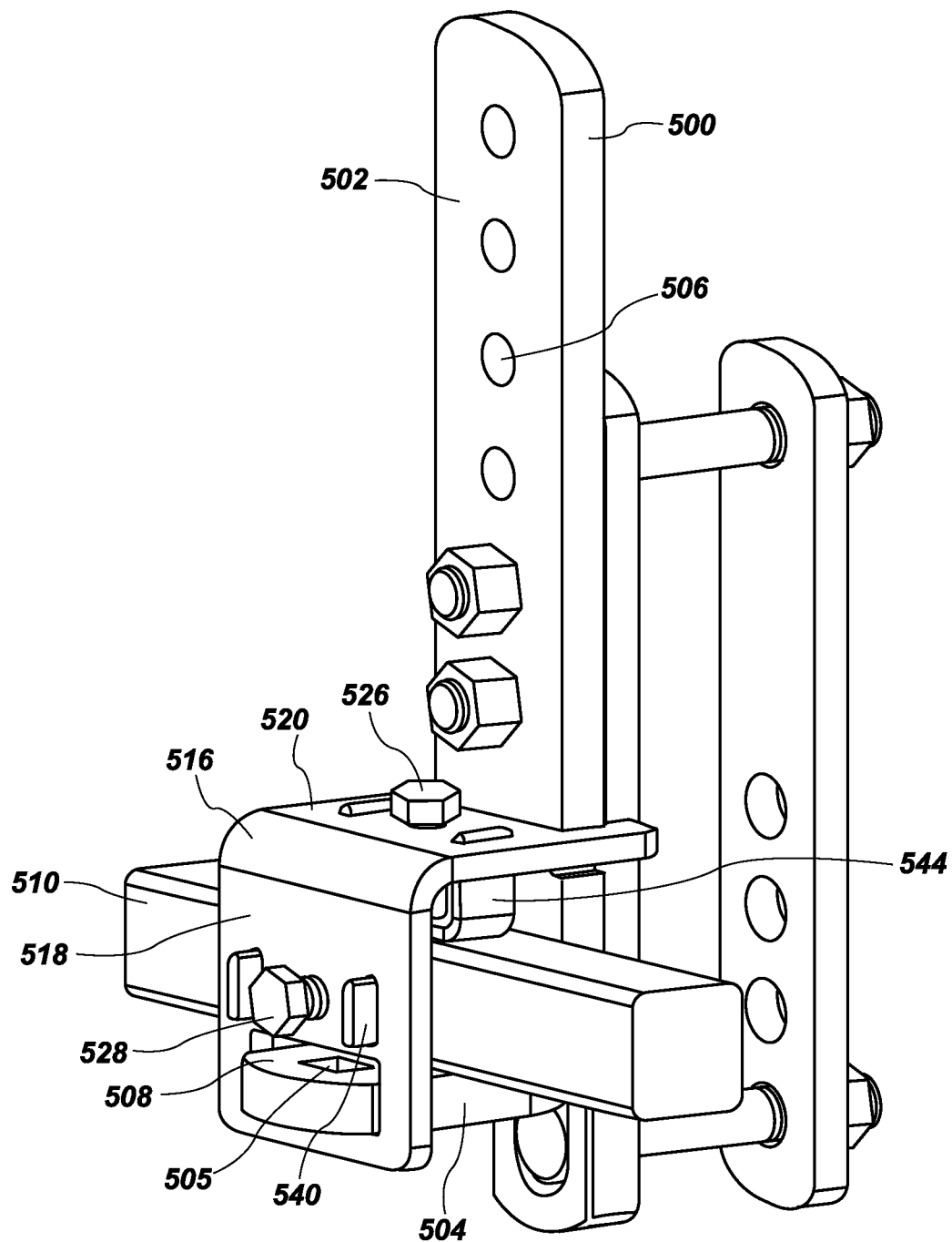
FIG. 17 is a view of an embodiment of an L-bracket having a clamp assembly.
Figure 18:
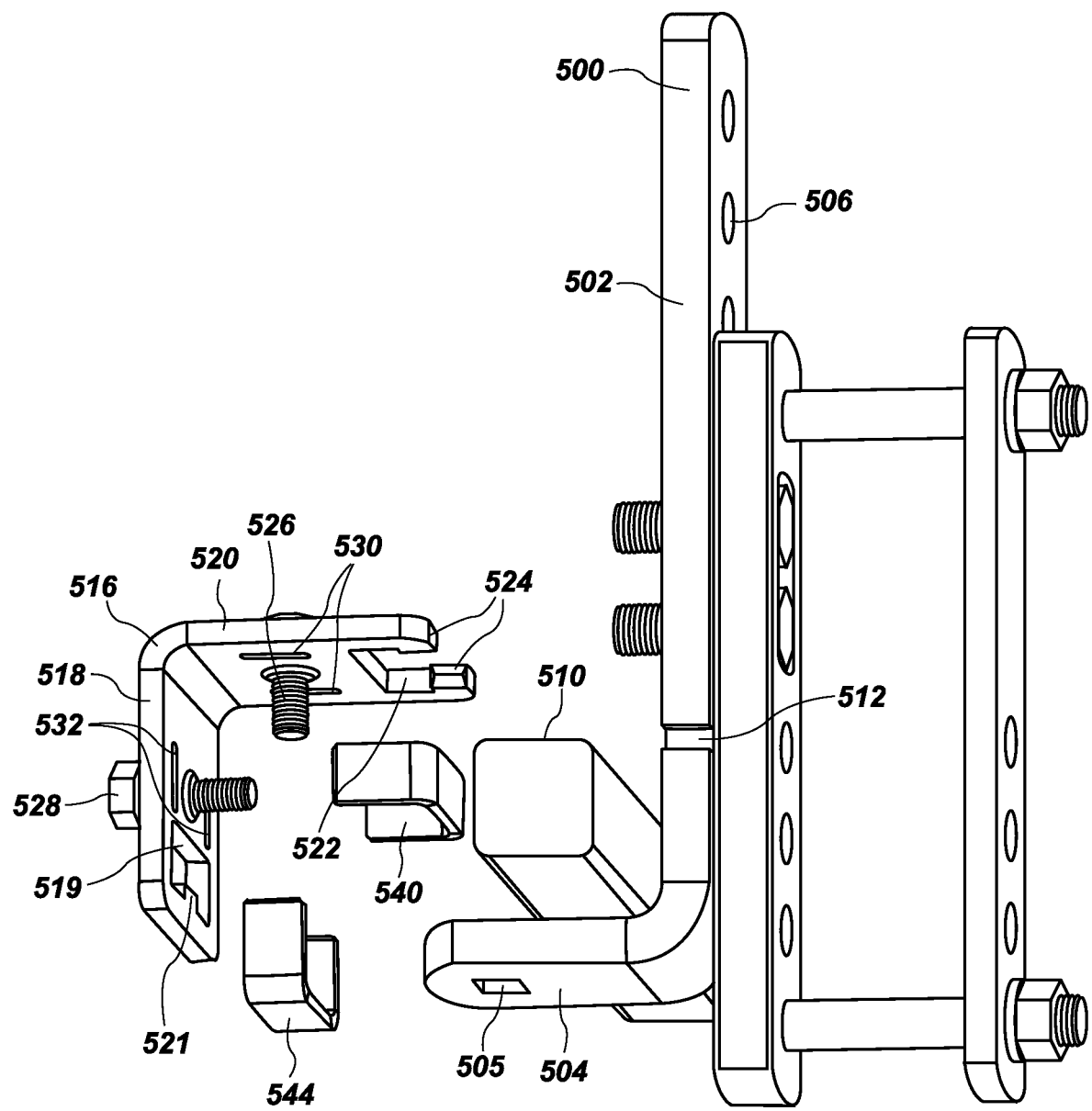
FIGS. 18 and 19 are exploded views of the L-bracket and clamp assembly depicted in FIG. 17.
Figure 19:
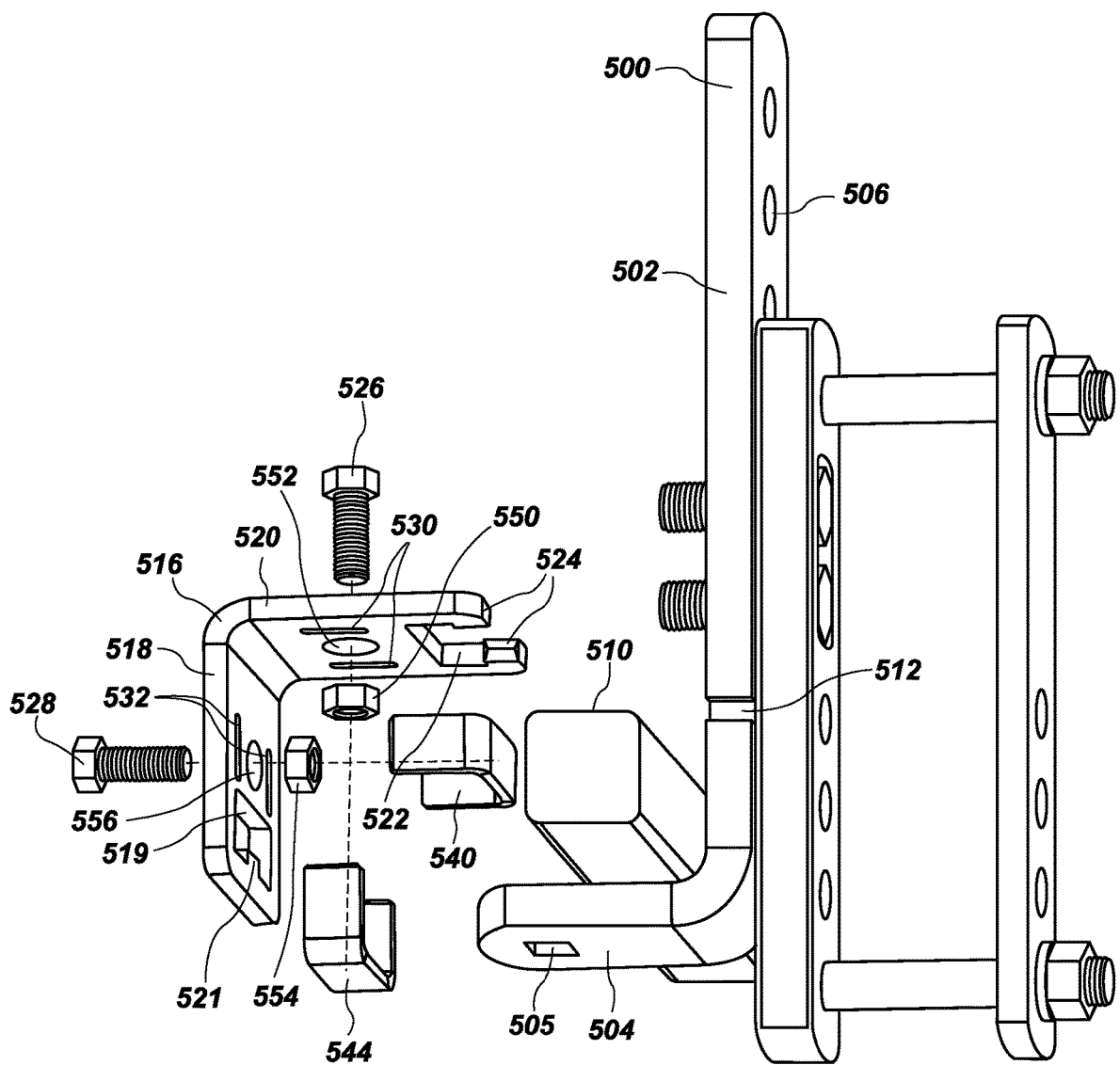

Referring now to FIGS. 17-19, there is depicted an embodiment of the present disclosure including an "L" bracket 500 comprising a vertical member 502 and a horizontal member 504. A plurality of mounting bores 506 may be formed in the vertical member 502 and may be utilized to mounted the "L" bracket 500 to a tongue of a trailer in a similar manner as the "L" bracket 43 shown in FIGS. 2 and 3. The horizontal member 504 may include a horizontal surface 508. The horizontal surface 508 may be adapted to receive a spring bar 510 connected to a hitch of a tow vehicle (not shown). The sides of the vertical member 502 may have a slotted portion 512 formed therein.

A clamping member 516 may include a vertical member 518 and a horizontal member 520 that may together define an "L" shape. Disposed on the end of the horizontal member 520 may be a slot 522. A pair of arms 524 may form an entrance to the slot 522. A threaded member 526 may extend through a threaded bore in the horizontal member 520. A threaded member 528 may extend through a threaded bore in the vertical member 518. The horizontal member 520 may have a pair of slots 530 formed therein. The vertical member 518 may also have a pair of slots 532 formed therein. The vertical member 518 may also have a slot 519 formed therein. The slot 519 may include a projection 521.

A clamp 540 may be "U" shaped. The ends of the clamp 540 may be adapted to fit into the slots 532. A clamp 544 may be "U" shaped. The ends of the clamp 544 may be adapted to fit into slots 530. A terminal end of the threaded member 526 may engage the clamp 544. A terminal end of the threaded member 528 may engage clamp 540.

When assembled, the slotted portion 512 of the vertical member 502 receives the arms 524 of the horizontal portion 520 of the clamping member 516 such that the slot 522 of the horizontal portion 520 receives the vertical member 502. The projection 521 of the slot 519 may engage a slot 505 in the horizontal member 504. Using the threaded members 526 and 528, the clamps 540 and 544 may be clamped onto the spring bar 510 such that all four sides of the spring bar 510 are clamped. In particular, the top and bottom surfaces of the spring bar 510 are clamped between the clamp 544 and the horizontal surface 508. The sides of the spring bar 510 are clamped between the clamp 540 and the vertical member 502.

As perhaps best seen in FIG. 19, the threaded member 526 may engage a threaded bore of a nut 550. The nut 550 may fit into a bore 552, which for example may be a counterbore, in the horizontal member 520. Likewise, the threaded member 528 may engage a threaded bore of a nut 554. The nut 554 may fit into a bore 556, which for example may be a counterbore, in the vertical member 518.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for reducing sway between a tow vehicle and a trailer, said apparatus comprising:
   a support bracket mountable to a frame of said trailer;
   a first clamping member disposed on the support bracket;
   a second clamping member secured to the support bracket;
   a spring arm contacting the first clamping member and the second clamping member; and
   a resilient member disposed against the second clamping member;
   wherein said resilient member is configured and arranged to bias said second clamping member against said spring arm.

2. The apparatus of claim 1, wherein the first clamping member and the second clamping member apply a frictional force to said spring arm.

3. The apparatus of claim 2, wherein said first and second clamping members apply the frictional force to at least one corner of the spring arm.

4. The apparatus of claim 1, wherein a bottom surface of said spring arm contacts said first clamping member and a top surface of said spring arm contacts said second clamping member.

5. The apparatus of claim 1, wherein a bottom surface of said spring arm contacts said first clamping member, and wherein a top surface and a side surface of said spring arm both contact said second clamping member.

6. The apparatus of claim 1, wherein said support bracket is bolted to the frame of the trailer.

7. The apparatus of claim 1, wherein said first clamping member is affixed in a stationary manner to said support bracket and said second clamping member is moveable with respect to said support bracket and said first clamping member.

8. The apparatus of claim 7, wherein said second clamping member is removably attachable to said support bracket.

9. The apparatus of claim 8, wherein said support bracket comprises a slot, and wherein said second clamping member comprises a projection member for engaging said slot.

10. The apparatus of claim 9, wherein said projection member comprises a bore for receiving a pin when said projection member is engaged in said slot, said pin operable to lock said projection member in said slot.

11. The apparatus of claim 1, further comprising a means for clamping said first and second clamping members against one or more surfaces of the spring arm.

12. The apparatus of claim 11, wherein said means for clamping comprises a threaded shaft member and a threaded bore, wherein tightening said threaded shaft in said threaded bore clamps said first and second clamping members against the one or more surfaces of the spring arm.

13. The apparatus of claim 1, wherein said second clamping member comprises a moveable clamping member, said moveable clamping member operable to prevent said spring arm from disengaging contact with said first clamping member.

14. An apparatus for reducing sway between a tow vehicle and a trailer, said apparatus comprising:
   an L-shaped support bracket, said L-shaped support bracket having a horizontal surface for engaging a spring arm and a vertical member for engaging a frame of the trailer; and
   a clamping mechanism integrated into said L-shaped support bracket, said clamping mechanism operable to apply a frictional force to said spring arm to thereby oppose movement of said spring arm, wherein said clamping mechanism comprises a moveable clamping member, said moveable clamping member operable to prevent said spring arm from disengaging said horizontal surface.

15. The apparatus of claim 14, wherein said clamping mechanism applies the frictional force to a first side surface and a second side surface of the spring arm.

16. The apparatus of claim 14, wherein said clamping mechanism applies the frictional force to a top surface and a bottom surface of the spring arm.

17. The apparatus of claim 14, wherein said clamping mechanism applies the frictional force to a top surface, a bottom surface, a first side surface and a second side surface of the spring arm.

18. The apparatus of claim 14, wherein said clamping mechanism applies the frictional force to at least one corner of the spring arm.

19. The apparatus of claim 14, wherein said support bracket is bolted to the frame of the trailer.

20. The apparatus of claim 14, wherein said clamping mechanism comprises a first clamping member and a second clamping member, wherein said first clamping member is affixed in a stationary manner to said L-shaped support bracket and said second clamping member is moveable with respect to said L-shaped support bracket and said first clamping member.

21. The apparatus of claim 20, wherein said second clamping member is removably attachable to said L-shaped support bracket.

22. The apparatus of claim 21, wherein said L-shaped support bracket comprises a slot, and wherein said second clamping member comprises a projection member for engaging said slot.

23. The apparatus of claim 22, wherein said projection member comprises a bore for receiving a pin when said projection member is engaged in said slot, said pin operable to lock said projection member in said slot.

24. The apparatus of claim 14, wherein said clamping mechanism comprises a first clamping member and a second clamping member, and wherein said clamping mechanism further comprises a means for clamping said first and second clamping members against one or more surfaces of the spring arm.

25. The apparatus of claim 24, wherein said means for clamping comprises a threaded shaft member and a threaded bore, wherein tightening said threaded shaft in said threaded bore clamps said first and second clamping members against the one or more surfaces of the spring arm.

26. An apparatus for reducing sway between a tow vehicle and a trailer, said apparatus comprising:
   a support bracket mountable to a frame of said trailer, said support bracket having a support location for receiving a tapered spring arm; and
   a clamping mechanism having a first clamping member, said clamping mechanism operable to apply a frictional force to thereby oppose movement of said tapered spring arm;
   wherein said clamping mechanism comprises a resilient member for biasing said first clamping member against a surface of the tapered spring arm, and a top surface of said spring arm contacts said first clamping member, and said clamping mechanism applies the frictional force to a top surface and a bottom surface of the spring arm.

27. The apparatus of claim 26, wherein said clamping mechanism applies the frictional force to a first side surface and a second side surface of the spring arm.

28. The apparatus of claim 26, wherein a top surface and a side surface of said spring arm contact said first clamping member, wherein said clamping mechanism applies the frictional force to a top surface, a bottom surface, and a side surface of the spring arm.

29. The apparatus of claim 26, wherein said first clamping mechanism applies the frictional force to at least one corner of the spring arm.

30. The apparatus of claim 26, wherein said support bracket is bolted to the frame of the trailer.

31. The apparatus of claim 26, wherein said clamping mechanism further comprises a second clamping member, wherein said second clamping member is affixed in a stationary manner to said support bracket and said first clamping member is moveable with respect to said support bracket and said second clamping member.

32. The apparatus of claim 31, wherein said first clamping member is removably attachable to said support bracket.

33. The apparatus of claim 26, wherein said support bracket comprises a slot, and wherein said first clamping member comprises a projection member for engaging said slot.

34. The apparatus of claim 33, wherein said projection member comprises a bore for receiving a pin when said projection member is engaged in said slot, said pin operable to lock said projection member in said slot.

35. The apparatus of claim 26, wherein said clamping mechanism further comprises a second clamping member, and wherein said clamping mechanism further comprises a means for clamping said first and second clamping members against one or more surfaces of the tapered spring arm.

36. The apparatus of claim 35, wherein said means for clamping comprises a threaded shaft member and a threaded bore, wherein tightening said threaded shaft in said threaded bore clamps said first and second clamping members against the one or more surfaces of the spring arm.

37. An apparatus for reducing sway between a tow vehicle and a trailer, said apparatus comprising:
   a support bracket mountable to a frame of said trailer, said support bracket having a support location;
   a spring arm received in said support location;
   a clamping member; and
   at least one fastener for securing said clamping member to the support bracket;
   wherein said spring arm is clamped between said support location and said clamping member to thereby oppose movement of the spring arm, and said clamping member has a first surface and a second surface, said first surface and said second surface of the clamping member engaging a first surface and a second surface of said spring arm.

* * * * *